US006355291B1

(12) United States Patent
Rose et al.

(10) Patent No.: US 6,355,291 B1
(45) Date of Patent: Mar. 12, 2002

(54) PROCESS FOR REDUCING FLATULENCE IN LEGUMES

(75) Inventors: Sara Rose; Condon S. Bush, both of Knoxville, TN (US); Griscom Bettle, III, Sarasota, FL (US); Joseph L. Rutzinski, Morristown; Larry Malnati, Dandridge, both of TN (US)

(73) Assignee: Bush Brothers & Company, Knoxville, TN (US)

( * ) Notice: Subject to any disclaimer, the term of this patent is extended or adjusted under 35 U.S.C. 154(b) by 0 days.

(21) Appl. No.: 09/489,745

(22) Filed: Jan. 21, 2000

Related U.S. Application Data

(60) Provisional application No. 60/116,894, filed on Jan. 22, 1999.

(51) Int. Cl.[7] .............................. A23L 1/20; A23L 1/211
(52) U.S. Cl. ....................... 426/431; 426/634; 426/507; 426/473; 426/479
(58) Field of Search ................................ 426/634, 507, 426/431, 478, 479

(56) References Cited

U.S. PATENT DOCUMENTS

| 202,975 | A | 4/1878 | Andres |
|---|---|---|---|
| 1,495,736 | A | 5/1924 | Hadley |
| 1,548,796 | A | 8/1925 | Libby |
| 1,718,187 | A | 6/1929 | Bartlett |
| 1,813,268 | A | 7/1931 | Bachler |
| 2,232,282 | A | 2/1941 | Struble |
| 2,278,475 | A | 4/1942 | Musher |
| 2,360,062 | A | 10/1944 | Lannen |
| 2,952,543 | A | 9/1960 | Szczesniak et al. |
| 3,126,285 | A | 3/1964 | Lippold |
| 3,220,451 | A | 11/1965 | Bollens et al. |
| 3,253,930 | A | 5/1966 | Gould et al. |
| 3,290,159 | A | 12/1966 | Dorsey et al. |

(List continued on next page.)

OTHER PUBLICATIONS

Abdel–Gawad, A. S., "Effect of domestic processing on oligosaccharide content of some dry legume seeds," *Food Chemistry*, vol. 46, (1993), pp. 25–31.

"The International Dry Bean Symposium," Michigan State University, Michigan Bean Commission, Michigan Bean Shippers Association, Aug. 22–24, 1972.

Borejszo, Z., et al., "Reduction of Flatulence–Causing Sugars by High Temperature Extrusion of Pinto Bean High Starch Fractions," *Journal of Food Science*, vol. 57(3), (1992), pp. 771–772.

(List continued on next page.)

*Primary Examiner*—Anthony J. Weier
(74) *Attorney, Agent, or Firm*—Scully, Scott, Murphy & Presser

(57) ABSTRACT

The present invention is directed to a method of preparing a legume resulting in reduced flatulence when ingested and the product thus prepared. It is also directed to a process for reducing the flatulence of a flatulence-causing legume. It is also directed to a product produced therefrom.

55 Claims, 5 Drawing Sheets

U.S. PATENT DOCUMENTS

| | | |
|---|---|---|
| 3,364,034 A | 1/1968 | Hoersch et al. |
| 3,594,184 A | 7/1971 | Hawley et al. |
| 3,594,185 A | 7/1971 | Hawley et al. |
| 3,594,186 A | 7/1971 | Hawley et al. |
| 3,598,610 A | 8/1971 | Hawley et al. |
| 3,632,346 A | 1/1972 | Sherba |
| 3,869,556 A | 3/1975 | Rockland et al. |
| 3,876,807 A | 4/1975 | Wagner et al. |
| 3,971,856 A | 7/1976 | Daftary |
| 3,973,047 A | 8/1976 | Linaberry et al. |
| 4,064,277 A | 12/1977 | Yokotsuka et al. |
| 4,194,016 A | 3/1980 | Weaver et al. |
| 4,216,235 A | 8/1980 | Dasek et al. |
| 4,333,955 A | 6/1982 | Murata et al. |
| 4,376,127 A | 3/1983 | Lunde |
| 4,376,128 A | 3/1983 | Lunde |
| 4,407,840 A | 10/1983 | Lathrop et al. |
| 4,483,874 A | 11/1984 | Olsen |
| 4,645,677 A | 2/1987 | Lawhon et al. |
| 4,729,901 A | 3/1988 | Rockland et al. |
| 4,871,567 A | 10/1989 | Sterner et al. |
| 4,908,224 A | 3/1990 | Yoder |
| 5,100,679 A | 3/1992 | Delrue |
| 5,436,003 A | 7/1995 | Rohde, Jr. et al. |
| 5,445,957 A | 8/1995 | Rohde, Jr. et al. |
| 5,545,425 A | 8/1996 | Wu |
| 5,599,572 A | 2/1997 | Bourne |
| 5,607,712 A | 3/1997 | Bourne |
| 5,645,879 A | 7/1997 | Bourne |
| 5,648,210 A | 7/1997 | Kerr et al. |
| 5,651,967 A | 7/1997 | Rohde et al. |
| 5,710,365 A | 1/1998 | Kerr et al. |
| 5,773,699 A | 6/1998 | Kerr et al. |
| 5,871,801 A | 2/1999 | Kazemzadeh |
| 6,238,725 B1 | 5/2001 | Bush et al. |

OTHER PUBLICATIONS

Calloway, D. H., et al., "Reduction of Intestinal Gas–Forming Properties of Legumes by Traditional and Experimental Food Processing Methods," *Journal of Food Science*, vol. 36, (1971), pp. 251–255.

Fleming, S. E., "Flatulence Activity of the Smooth–Seeded Field Pea as Indicated by Hydrogen Production in the Rat," *Journal of Food Science*, vol. 47, (1981), pp. 12–15.

Fleming, S. E., "A Study of Relationships Between Flatus Potential and Carbohydrate Distribution in Legume Seeds," *Journal of Food Science*, vol. 46, (1981), pp. 794–803.

Fyfield, T. P., et al., "Effects of Temperature and Water Potential on Germination, Radicle Elongation and Emergence of Mungbean," *Journal of Experimental Botany*, vol. 40(215), Jun. 1989, pp. 667–674.

Ganiats, T. G., et al., "Does Beano Prevent Gas? A Double––blind Crossover Study of Oral α–Galactosidase to Treat Dietary Oligosaccharide Intolerance," *The Journal of Family Practice*, vol. 39(5), Nov. 1994, pp. 441–445.

Goel, R., et al., "Removal of Flatulence Factor of Some Pulses by Microbial Fermentation," *The Ind. J. Nutr. Dietet.*, vol. 18, (1980), pp. 215–217.

Hsu, D., et al., "Effect of Germination on Nutritive Value and Baking Properties of Dry Peas, Lentils, and Faba Beans," *Journal of Food Science*, vol. 45, (1980), pp. 87–92.

Iyer, V., et al., "Quick–cooking beans (*Phaseolus vulgaris* L.): I. Investigations on quality," *Qual. Plant Plant Foods Hum. Nutr.*, vol. 30, (1980), pp. 27–43.

Kinsella, J. E., "Functional Properties of Proteins in Foods: A Survey," *Critical Reviews in Food Science and Nutrition*, Apr. 1976, pp. 219–280.

Khokhar, S., et al., "Physico–Chemical Characteristics of Khesari Dhal (*Lathyrus sativus*): Changes in α–Galactosides, Monosaccharides and Disaccharides during Food Processing," *J. Sci. Food Agric.*, vol. 70, (1996), pp. 487–492.

Ingrassia, L., "Dr. Colin Leakey, A Real Bean Counter, Finds Profit Elusive," *The Wall Street Journal*, Apr. 1, 1997, p. 1.

Leakey, C.L.A., et al., "Beans, Fibre, Health and Gas," *Agri–Food Quality: an Interdisplinary Approach*, pp. 175–180.

Liu, K., et al., "Mechanism of Hard–to–Cook Defect in Cowpeas: Verification Via Microstructure Examination," *Food Structure*, vol. 12, (1993), pp. 51–58.

de Lumen, B. O., "Molecular Strategies to Improve Protein Quality and Reduce Flatulence in Legumes: A Review," *Food Structure*, vol. 11, (1992), pp. 33–46.

Mulimani, V. H., et al., "Enzymatic degradation of oligosaccharides in soybean flours," *Food Chemistry*, vol. 59(2), (1997), pp. 279–282.

Obendorf, R., "Oligosaccharides and galactosyl cyclitols in seed desiccation tolerance," *Seed Science Research*, vol. 7, (1997), pp. 63–74.

Olson, A. C., et al., "Flatus Causing Factors in Legumes," *Antinutrients and Natural Toxicants in Foods*, Food & Nutrition Press, Inc., (1981), pp. 275–294.

Abstract of Papers, Olson, A.C., "Flatus Causing Factors in Legumes," *American Chemical Society*, vol. 177(1), p. 37.

Powers, J. J., et al., "Gelation of Canned Peas and Pinto Beans as Influenced by Processing Conditions, Starch and Pectic Content," *Food Technology*, Feb. 1961, pp. 41–47.

Price, K. R., et al., "Flatulence—Causes, relation to diet and remedies," *Die Nahrung*, vol. 32(6), (1988), pp. 609–626.

Rao, V. S., et al., "Effects of Gamma–Irradiation on Flatulence–Causing Oligosaccharides in Green Gram (Phaseolus Areus)," *Journal of Food Science*, vol. 48, (1983), pp. 1791–1795.

Schoch, T. J., et al., "Preparation and Properties of Various Legume Starches," Nov. 1968, pp. 565–573.

Naczk, M., et al., "α–Galactosides of Sucrose in Foods: Composition, Flatulence–Causing Effects, and Removal," *American Chemical Society*, ACS Symposium Series 662, pp. 127–151.

Sathe, S. K., et al., "Dry Beans of Phaseolus. A review. Part 2. Chemical Composition: Carbohydrates, Fiber, Minerals, Vitamins and Lipids," *CRC Critical Reviews in Food Science and Nutrition*, vol. 21(1), pp. 41–93.

Sathe, S. K., et al., "Technology of Removal of Unwanted Components of Dry Beans," *CRC Critical Reviews in Food Science and Nutrition*, vol. 21(3), pp. 263–287.

Ku, S., et al., "Extraction of Oligosaccharides During Cooking of Whole Soybeans," *Journal of Food Science*, vol. 41, (1976), pp. 361–364.

Uebersax, M. A., et al., "Strategies and Procedures for Processing Dry Beans," *Food Technology*, Sep. 1991, pp. 104–110.

Kon, S., "Pectic Substances of Dry Beans and Their Possible Correlation with Cooking Time," *Journal of Food Science*, vol. 33, (1968), pp. 437–438.

Vidal–Valverde, C., et al., "Changes in the carbohydrate composition of legumes after soaking and cooking," *Journal of the American Dietetic Association*, vol. 93(5), May 1993, pp. 547–550.

"Flatulence Problem," *CRC Handbook of World Food Legumes*, vol. 1, pp. 64–74.

Chung, Y., Dissertion: "Changes in Cell Wall Structure and Starch Digestibility During Cooking of Dry Bean (Phaseolus Vulgaris L.)," Michigan State University, 1996.

King, M. M., Dissertion: "Alpha–Galactosidase Activity and Oligosaccharide Hydrolysis in cowpea (Vigna Unguiculata L. Walp) Seeds and Flour)," University of Arkansas, May 1987.

The Brilliant Bean, Bantam Book, Feb. 1988, by Sally & Martin Stone.

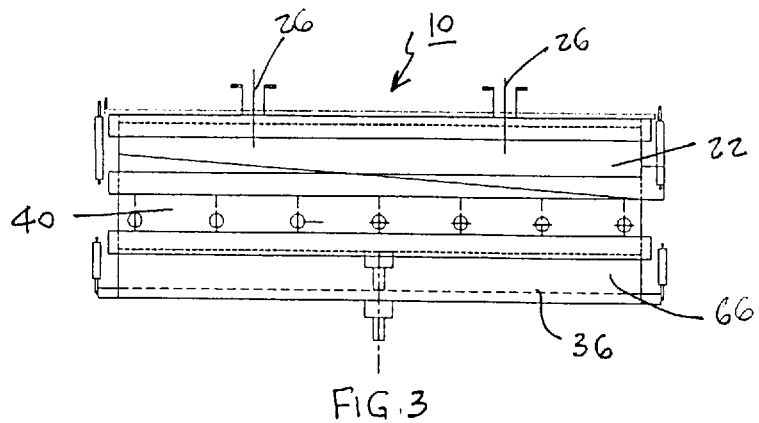
FIG. 3
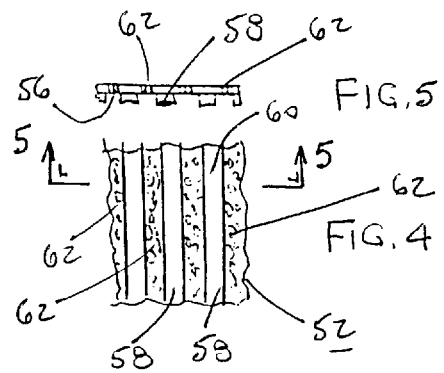
FIG. 5
FIG. 4
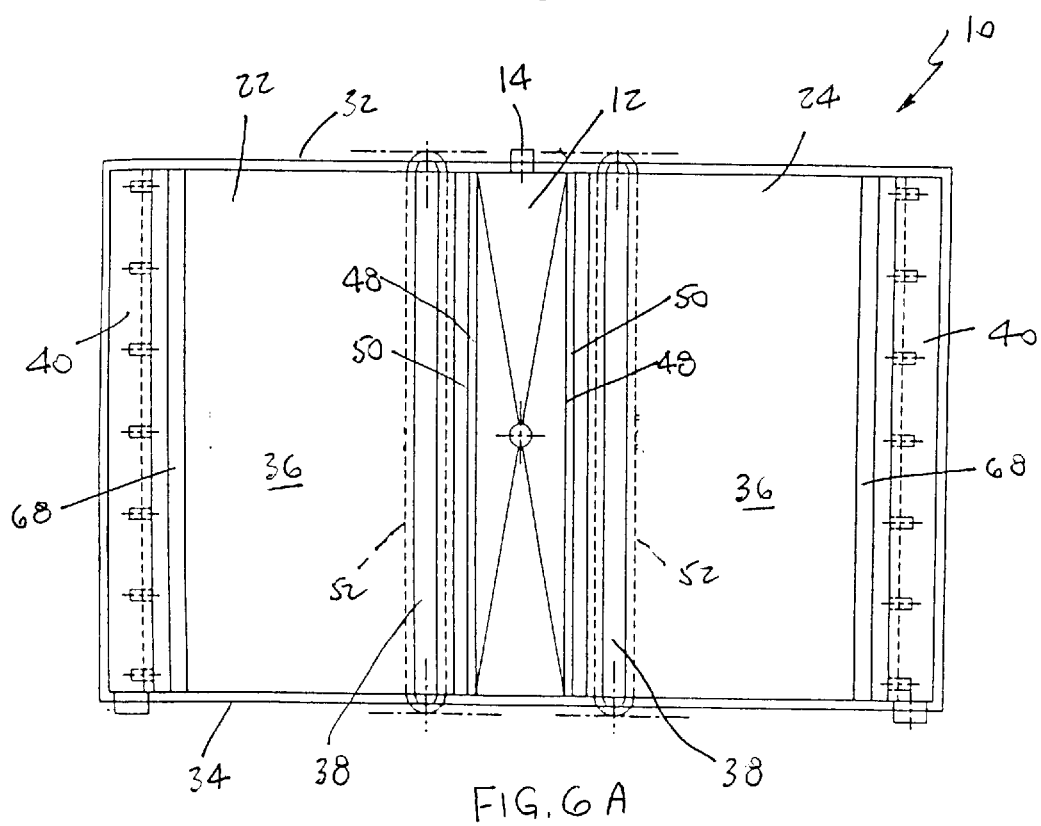
FIG. 6A

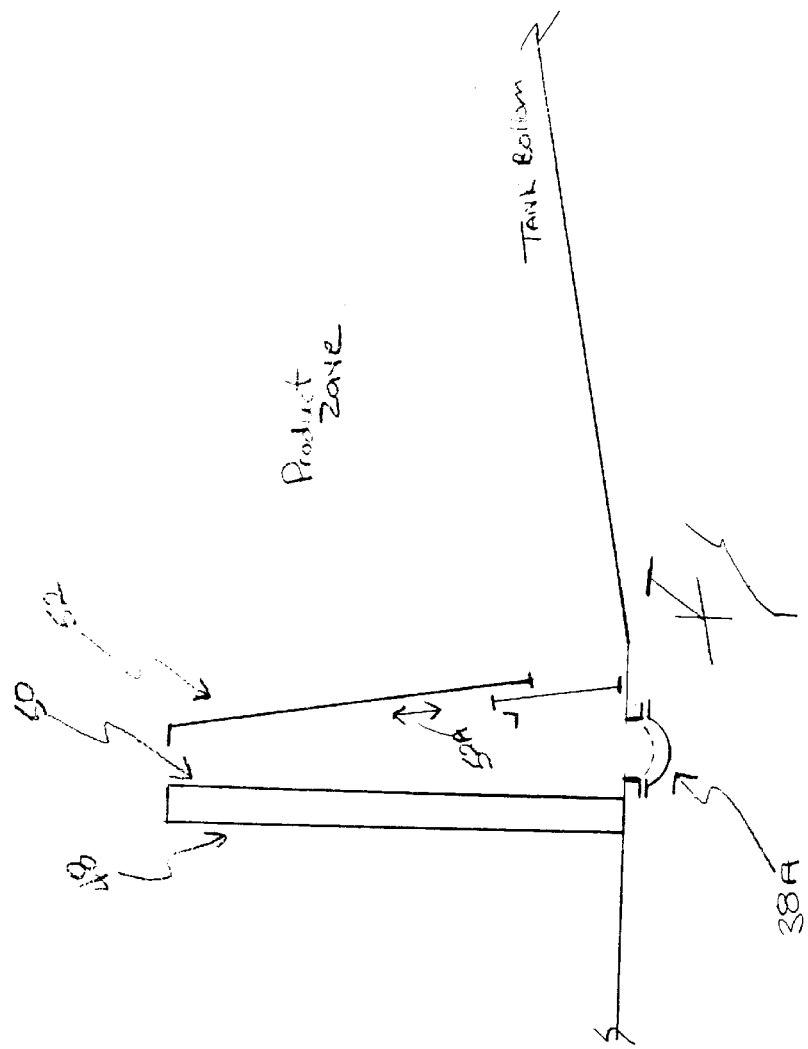

PROCESS FOR REDUCING FLATULENCE IN LEGUMES

RELATED APPLICATIONS

The present application is claiming benefit of copending provisional application U.S. Ser. No. 60/116,894 filed on Jan. 22, 1999. In addition, the contents of the provisional application, to the extent not described in the present application, are incorporated herein by reference.

FIELD OF THE INVENTION

The present invention relates to an improved process for preparing legumes exhibiting reduced flatulence when digested by mammals and a process for reducing flatulence in legumes when digested by mammals and the products thus prepared.

BACKGROUND OF THE INVENTION

Legumes are important foodstuffs and are likely to become more so in the future. For example, many legumes, especially those in some of the legume genuses, such as Phaseolus, Soja and Lens, are high in protein and provide an inexpensive alternative to animal protein.

Unfortunately, ingestion of some of the most nutritious and abundant legumes can be accompanied by severe flatulence as well as abdominal distress and poor digestibility. More specifically, the flatulence results in discomfort, diarrhea, loss of appetite, and poor growth, all of which have prevented the wide-scale use of these vegetable nutrients.

It is believed that the flatulence is due to various factors. For example, it has been postulated that the flatulence is attributable to the indigestibility by mammalian digestive enzymes of the flatulence-causing alpha oligosaccharides, such as raffinose, stachyose, and verbascose, and the like, present in legume products. The generally accepted explanation of the action of the alpha oligosaccharides in producing flatulence is that the enzyme alpha galactosidase, which hydrolyzes the $\alpha$-oligosaccharides, is not present in the intestinal tract of mammals. Thus, these compounds are not hydrolyzed and dissolved in the digestive tract so that they can be absorbed. Instead, they reach the lower intestine essentially intact. Here, anaerobic bacteria ferment these sugars with the resultant production of carbon dioxide, hydrogen, and methane gases, thereby producing flatus.

However, these $\alpha$-oligosaccharides are believed not to be the only source present in the legume that causes flatulence. It has been reported that flatulence is also due to components present in the cell wall fiber constituents. Other have conjectured that undigested starch and protein in the legumes are contributing factors to flatus production.

Various solutions have been proposed to reduce flatulence in legumes, but many of these focus on just one of the factors described hereinabove, viz., the flatulence-causing oligosaccharides. More specifically, many proposed solutions relate to the use of enzymes to enhance the digestibility of the oligosaccharides. Thus, one solution is to add oligosaccharide-digesting enzymes to the legume itself or as a food supplement to be ingested substantially simultaneously with the ingestion of the legume. For example, U.S. Pat. No. 3,632,646 to Sherba discloses the addition to foodstuff, such as legumes, of $\alpha$-galactosidases or other enzyme preparations capable of hydrolyzing the 1,6-linkages of stachyose and other food containing flatulence-causing polysaccharides. U.S. Pat. Nos. 4,376,127 and 4,376,128 to Lunde disclose a process of improving the digestibility of legumes and reducing the flatulence thereof by adding an enzyme system found in pineapple and papaya to the legumes prior to cooking said legumes. U.S. Pat. No. 5,651,967 to Rohde, Jr., et al. discloses a food supplement comprising a beta-fructofuranosidase which is alleged to enhance the digestibility of sugars and reduce flatulence. U.S. Pat. Nos. 5,445,957 and 5,651,967 disclose a food supplement to be ingested simultaneously with the legume comprising a beta-fructofurnanosidase enzyme, a cellulose enzyme and a hemicellulose enzyme which together alleviate gastrointestinal distress caused from the digestion of legumes.

Another solution is leaching the oligosaccharides from the legumes. For example, one method is to soak the legume product in water. Sometimes, the soak is in hot water that gradually cools as the soaking progresses. The soaking water may or may not be changed with fresh water. By this method, it has been found that soaking significantly decreases the $\alpha$-galactoside content in lentils. (See, Frias, et al, *Journal of Food Protection,* 1995, 58, 692–695.) In addition, it has been found that cooking, by either boiling or pressure cooking, also decreases the $\alpha$-galactoside content. (See, Vidal-Valverde, et al., *Journal of American Dietetic Association,* 1993, 93, 547–550).

Industrial soaking, which can be used to leach the oligosaccharides from the legumes, falls into two main processes. The most practiced is an ambient or initially warm soak that is allowed to cool naturally for several hours, followed by a very short blanch at typically 180° F. The high controlled-temperature blanch is used to optimize initial rehydration, deaerate the legumes and coagulate the protein to prevent starch leaching out of the legumes during cooking.

A second industrial process is to use multiple short soak times at temperatures sufficient to accelerate the rehydration process. In this process, the legumes are heated in a series of blanchers.

Other methods utilized and/or proposed to reduce flatulence include dehulling of the bean (See U.S. Pat. No. 202,975); fermenting the legume with a microbe (See, Goel, et al., *Indian J. Nutr. Dictet,* 1980, 18, 215–217); and germinating the legume (See, e.g., Rao, et al. *J. Agric Food Chem.,* 1978, 26, 316–319). In fact, Rao, et al. in the *Journal of Food Science,* 1983, 1791–1795, disclose that $\gamma$-irradiation is effective for elimination of flatulence-causing oligosaccharides in legumes during germination.

In the Ph.D. thesis of Matrid King from the University of Arkansas (1987), the use of endogenous $\alpha$-galactosidase in cowpeas was explored for the purpose of removing the flatulence-causing oligosaccharides therefrom. For example, soaking, germination, and fermentative and non-fermentative incubation treatments for stimulating αgalactosidase hydrolysis of the oligosaccharides were investigated. The thesis disclosed that the enzyme activity of the $\alpha$-galactosidase increased until a temperature maximum of 113° F. was obtained, i.e., above this temperature the enzyme activity decreased. For example, a two minute incubation at 50° C. (122° F.), 55° C. (129° F.) and 60° C. (140° F.) resulted in a 50, 70 and 90% loss of activity compared to the activity at 113° F. In addition, King disclosed that endogenous αgalactosidase has maximum enzymatic activity at a pH ranging between 4.0 and 5.0.

Although these methods described hereinabove may be useful in reducing flatulence caused by oligosaccharides, these methods have not been successful in substantially removing the flatulence-causing oligosaccharides from the legumes. In addition, these methods have ignored the flatulence caused by other components of the legumes. It has been suggested by researchers, however, that, at least with beans, oligosaccharides account for only about ⅓ of the cause of flatulence, and that ⅔ is caused by other components such as, e.g., undigested starch in the bean. Other research indirectly suggests that the sugars are responsible for the violent "episodes" that occur approximately within five hours after ingestion of the legume, while "background flatulence", which occurs regularly over a six to eight hour period after eating, is caused by the non-digested starch. Unfortunately, very little research, in comparison, has been directed to reducing the flatulence caused by these other components.

Recently, Yansoo Chung, in his Ph.D. thesis from Michigan State University (1996), reported that cooking whole navy beans for 10 minutes caused starch crystallization within the cell wall of the navy beans, thus impeding and preventing the digestive enzymes in the stomach from digesting (hydrolyzing) the starch.

Therefore, additional investigations are required to find the appropriate conditions to prevent such crystallization from occurring and thereby enhance the digestibility of these starches in the bean.

In copending application entitled "A PROCESS FOR REDUCING FLATULENCE IN LEGUMES", having U.S. Ser. No. 09/236,314, a process was described which significantly reduced the flatulence of legumes by (1) rehydrating the cleaned legume in a first water bath, (2) soaking and heating the rehydrated legume at a second temperature to permit diffusion of the flatulence-causing oligosaccharides from the legume to the soak water and permit the naturally occurring oligosaccharide reducing enzyme in the legume to digest the remaining flatulence-causing oligosaccharides in the legume, said second temperature being greater than the first temperature but lower than the inactivation temperature of the enzyme; (3) heating the legume to a third temperature under conditions effective to initiate starch gelatinization, said third temperature being greater than the first and second temperatures but less than the temperature to substantially coagulate the protein surrounding the starch in the legume; and optionally blanching the legume. It was indicated in the specification that the order of the steps was important, i.e., after the completion of each step, the temperature was increased to the temperature in the subsequent step and that it was important that oligosaccharide removal was completed before proceeding to step (3) since step (3) was conducted at temperatures above the inactivation temperature of the oligosaccharide reducing enzyme.

However, the present inventors have developed an improved process in which the legumes are soaked at temperatures which are about or greater than the inactivation temperature of the oligosaccharide-reducing enzyme prior to conducting any substantial oligosaccharide reduction in the legume. Moreover, the present inventors have found a process which is substantially more efficient than that which is described in the copending application described hereinabove. Furthermore, the products formed by the present process have consistently less cracking and better texture and mouthfeel.

The present inventors have developed a process which not only produces a legume with reduced flatulence and enhanced starch gelation, but also produces a legume which has the texture, taste, smell, appearance and feel—in short, the organoleptic properties—of processed canned or frozen legumes that are commercially sold in the United States.

Thus, the inventors have found an efficient means to effectively reduce the flatulence from the digestion of legumes, such as beans and found a process which produces a low flatulence legume having the organoleptic properties of processed, e.g., canned or frozen legumes, sold commercially.

SUMMARY OF THE INVENTION

The present invention is directed to a process for reducing the flatulence caused by the digestion of the legume in mammals, which process comprises:

(1) soaking a legume in a water bath having stagnant, sprayed or flowing water at a first temperature which is above ambient temperature but less than the critical rehydration temperature, under conditions effective and for a period of time sufficient to produce a rehydrated legume having a moisture content which is at least 50% of that of a fully hydrated legume;

(2) heating the product of step (1) in a water bath to a second temperature under conditions effective to increase the moisture content to an amount which is greater than full hydration, said second temperature being greater than the first temperature and the critical rehydration temperature and at or greater than the temperature of inactivation of the oligosaccharide reducing enzyme present in the legume, and less than the temperature of maximum starch gelation;

(3) soaking and heating the rehydrated legume of step (2) at a third temperature which is greater than the critical rehydration temperature but at a temperature less than the second temperature and less than the temperature of inactivation of said enzyme under conditions effective to substantially remove all of the flatulence-causing oligosaccharides therefrom; and (4) optionally blanching the product of step (4) at blanching effective temperatures, said blanching temperature being greater than the first, second and third temperatures.

In another embodiment of the present invention, the legumes are prepared by the above process with an additional step between steps 1 and 2. More specifically, the product of step (1) is first heated in a soak water bath at a transition temperature which is greater than the first temperature but less than the second temperature.

In still another embodiment of the present process, the soak water is fully or partially drained and replaced with fresh water which is added or bled in during the full or partial drain; this may occur after or even during any of the steps enumerated hereinabove at a rate sufficient to maintain a positive oligosaccharide driving force at a level that minimizes cracking for a time sufficient to reduce the brix of said soak water. This step can be repeated any number of times or executed continuously to reduce the remaining oligosaccharide in the legume to a desired level.

In another embodiment, an aqueous solution of a food grade calcium sequestering agent, such as a phosphate salt, is added to the soak water at a concentration and time sufficient to soften the legumes as desired. The calcium sequestering agent can be added before, during or after any step in the process described hereinabove. However, it is preferably added during or prior to step (1), although it is even more preferable that the legumes are rinsed in a dilute solution thereof during or after step (4), if the legumes are blanched or during or after step (3), if there is no blanching step.

The present invention is also directed to the preparation of a legume exhibiting reduced flatulence when digested by a mammal, which comprises repeating steps (1)–(3) hereinabove, and optionally step (4) and the other steps described hereinabove, and then (5) mixing the legume product of step (4) with a food acceptable vehicle to form a legume-based mixture; and (6) treating the product of step (5) under the desired preservation methods.

The present invention is also directed to the product thus formed by the processes described hereinabove.

BRIEF DESCRIPTION OF THE DRAWINGS

FIG. 3 illustrates an end view of the soak tank of FIG. 1;

FIG. 4 illustrates a fragmentary view of a portion of the screen in the soak tank, as viewed in the direction of arrows A in FIG. 2;

FIG. 5 illustrates a sectional view taken along line 5—5 in FIG. 4;

FIG. 6A illustrates, in a view similar to FIG. 1, the product discharge gates of the soak tank operating horizontally;

FIG. 6B illustrates, generally diagrammatically, the product discharge gates of the soak tank operating vertically;

DETAILED DESCRIPTION OF THE INVENTION

Figure 1:
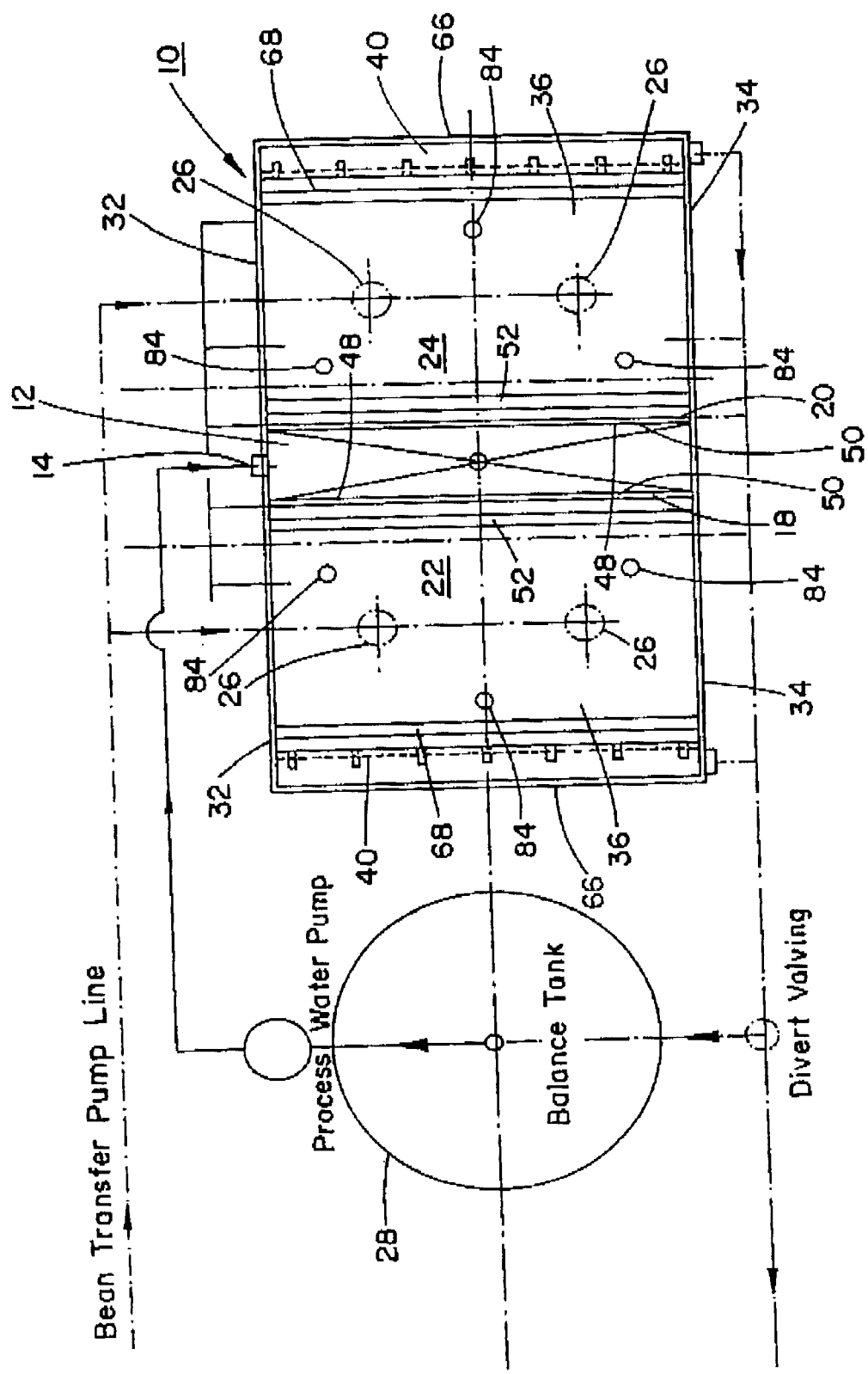
FIG. 1 illustrates, generally diagrammatically, a top plan view of a horizontal flow soak tank system pursuant to the present invention.

As used herein, the term "legume" refers to a vegetable belonging to the family Leguminosae. It is characterized as having a dry, dehiscent fruit derived from a single, simple pistil. When mature, it splits along both dorsal and ventral sutures into two valves. The family Leguminosae characteristically contains a single row of seeds attached along the lower or ventral suture of the fruit. Ordinarily, the legume seeds used for the present invention are the usual dry seeds available in commerce. For example, in the case of beans, these products are referred to as dry beans because the product includes only the mature seeds, the pods having been removed. Examples of legume seeds useful in the present invention include seeds of the genus Phaseolus, including, without limitation, the common beans such as large white or Great Northern, small white, pinto, red kidney, black, calico, pink cranberry, red mexican, brown, bayo, lima, navy and the like; the genus Pisum, including, without limitation, smooth and wrinkled peas and yellow or green varieties and the like; the genus Vigna, including the black eye beans (or black eye peas as they are sometimes termed), cowpeas, purple hull peas, cream peas, crowder peas, field peas and the like; the genus Lens, including without limitation, lentils; the genus Cicer, including, without limitation, garbanzo beans and chick peas; the genus Soja, including, without limitation, soybeans; and the like. Other examples of legume seeds useful in the present invention include red beans, yellow-eye beans, azuki beans, mung beans, tepary beans, and fava beans and the like. The preferred legumes are those from the genus Phaseolus, Cicer, and Vigna. The more preferred legumes are navy beans, pinto beans, kidney beans, large white or Great Northern beans, small white beans, black beans, red beans, pink beans, lima beans, lentil, cow peas, soybean, black-eye peas, field peas, garbanzo beans and chick peas. The most preferred legumes are beans, especially navy beans, pinto beans, and kidney beans.

As defined herein, the term "naturally occurring oligosaccharide-reducing enzyme" is the enzyme naturally present in the legume which is capable of modifying the flatulence-causing oligosaccharides, as defined herein. Without wishing to be bound, it is believed that in beans, especially the genus Phaseolus, including navy beans, this enzyme is α-galactosidase. "Flatulence-causing oligosaccharides", as defined herein, are oligosaccharides that are not digestible by the mammal and cause flatulence as a result therefrom. They are not simple sugars, but include trisaccharides and higher saccharides. Examples include raffinose, stachyose, verbascose, and the like.

As described hereinabove, aspects of the present invention are directed to a process of reducing flatulence in mammals when digesting legumes and a process of preparing legumes exhibiting this reduced flatulence when digested by mammals. The term "mammals" includes any species of the class Mammalia of higher vertebrates which are characterized by, inter alia, being warm blooded, having mammary glands, and having a body covered by hair. Examples include man, dog, cat, horse, pig, cow and the like.

The present inventors realized that many factors contribute to the flatulence caused by legumes. Obviously, one of the objectives of the present invention is to remove the flatulence-causing oligosaccharides, but the present inventors realized that there are other components in addition thereto present in the legume which are responsible for producing flatulence when the legume is ingested by mammals, which other components the prior art has neglected to consider in attempts to reduce flatulence. An example thereof includes undigestible or crystalline starch. The objective therefore was to either substantially alter or remove these flatulence-causing components from the legume or make these flatulence-causing components more digestible by endogenous enzymes in the mammal or a combination thereof. In addition to removing the flatulence-causing sugars (since the mammalian digestive tract lacks the appropriate endogenous α-galactosidase required to effect digestion of these sugars), the inventors have also found that flatulence can be significantly reduced if these other contributing components referred to hereinabove were made more readily digestible. As described hereinbelow the present methodology also includes steps that take into account these other components, such as, e.g., maximizing starch gelation, to make the starch more digestible by the mammal, thereby decreasing the flatulence of the legume.

Utilizing the process described herein, the inventors have developed a means of producing legumes, including beans, that exhibit significantly less flatulence when digested. In particular, utilizing the methodology described hereinbelow, the legumes of the present invention have substantially all of the flatulence-causing oligosaccharides, e.g., raffinose, stachyose and verbascose, removed. The concentration of the flatulence-causing oligosaccharides in the legumes produced by the present process is preferably less than about 0.5% and more preferably less than 0.05% of the dry weight of the legume product produced by the present invention and even more preferably less than about 0.025% by weight and most preferably about 0% by weight.

The present inventors have found that undigested starch also contributes to flatulence; but, iffstarch gelatini{ation is above a critical level, then the amount of flatulence resulting from the undigestible starch is minimized. The inventors have found that by subjecting the legumes to the present process, the legumes achieve maximal starch gelatinization, thereby minimizing the amount of flatulence resulting therefrom. More specifically, as a result of the present process, substantially all of the gelatinizable starch in the legumes produced in accordance with the process described herein are gelatinized, making the legume products more digestible.

Legume starch is a restricted starch, meaning that not all of the starch is capable of becoming gelatinized. Moreover, different varieties of legumes have different percentages of total starch that is gelatinizable. However, by subjecting the legume to the process described hereinbelow, substantially all of the starch that could be gelatinized, is gelatinized. Preferably, in the legume product produced by the present invention, more than about 84% of the total starch (including gelatinizable as well as non-gelatinizable starch) in the legume is gelatinized and more preferably more than about 87% of the starch in the legume is gelatinized.

As described hereinbelow, the present process produces products resulting in less frequent episodes and less volume of flatulence, as well as reduction in other symptoms of discomfort, such as bloating, abdominal pain, belching and "feelings of fullness" relative to products commercially made and in the prior art.

The moisture content of the legume produced by the present process, however, is in the range normally found in legumes that are sold commercially. For example, with respect to beans, it is preferred that the moisture content in the product of the present invention ranges from about 40% to about 70% by weight, more preferably from about 45% to about 65% by weight, and most preferably from about 50% to about 63% by weight.

Thus, the present inventors have developed a process for implementing the aforementioned strategy, i.e., maximizing starch gelation and substantially removing the flatulence-causing oligosaccharides from the legumes.

In the present methodology, the legumes are subjected to conditions which permit the naturally occurring oligosaccharide reducing enzyme present in the legume to hydrolyze the flatulence-causing oligosaccharides and to permit the diffusion of the sugar from the legume to the soak water, as described hereinbelow.

In addition, the process of the present invention promotes starch gelatinization in the legume when the legume is subjected to starch gelatinization conditions, thereby enhancing the digestibility of the legume. As the skilled artisan is well aware, crystalline starch in the cell of the legume is not readily digestible. Thus, the strategy developed by the present inventors is to subject the legumes to conditions effective to maximally gelatinize the starch, i.e., permit the crystals of starch to transition to an amorphous form, while minimizing coagulation of the protein surrounding the starch granules.

Without wishing to be bound, it is believed that if protein coagulation occurs too prematurely, it will prevent the starch from fully swelling and gelatinizing, thereby causing the starch to remain undigestible by mammals when ingested. On the other hand, by minimizing protein coagulation before starch gelation, flatulence is reduced since the hydrolyzed starch granules are digestible by the mammal when ingested.

Without wishing to be bound, it is believed that the presence of phytic acid promotes protein coagulation. The phytic acid is produced in the legume catalytically through the mediation of phytic acid producing enzymes.

While not meaning to be bound, it is believed that the protein coagulation temperature is affected by pH. When the pH is lowered, protein coagulates at a lower temperature. It is well known that legumes contain myoinositol hexaphosphate and that legumes also contain an enzyme, herein referred to as phytase, that breaks down hexaphosphate into, among other compounds, phytic acid and phosphate. It is also well known that the most active temperature for the phytase or the phytic acid producing enzyme is about 122° F. and that phytase is largely inactivated at temperatures greater than 140° F.

At Step 1 soaking temperatures as defined herein, it is believed, without wishing to bound, that the phytase is activated and the soak water pH drops as a result thereof (as phytic acid is produced). The drop in pH is believed to lower the onset temperature of protein coagulation (premature protein coagulation). The present inventors have found that too low a pH reduced starch gelation, presumably by encouraging premature protein coagulation. It is also believed that the phosphate released by the phytase sequesters calcium in the legume, thus removing calcium therefrom.

It is well known that another family of enzymes, pectin methyl esterase, herein referred to as pectase, stiffens cell walls when the enzymatically formed pectate reacts with free calcium to form calcium pectate. Without wishing to be bound, it is believed that the pectase reaction is first activated at the critical rehydration temperature. It is also well known that phosphate in sequester calcium.

Without wishing to be bound, it is believed that the Step 1 soaking conditions then is a balance between not creating excess phytic acid to discourage unwanted premature protein coagulation (a form of cell wall strengthening) and simultaneously forming phosphate which ties up excess calcium, and as a result, weakens the cell wall.

The order of the steps in the present process is critical. The sequence of steps follow a logical order whereby the legumes are subjected to a first temperature in the first step and then a higher temperature in step two, and then a lower temperature in the third step of the present process. Although within each step, the legumes may be subjected to various temperatures, and/or the temperature of treatment within each step may fluctuate, it is important for this process that the temperature for the treatment of the legumes in step 2 be higher than the temperature of treatment in step 1, and that the temperature of treatment of step 3 be lower than that of step 2, but higher than that utilized in the first step.

In the various process steps described hereinbelow, the legumes are placed in water and are soaked therein. Water sources known to the skilled artisan may be utilized in the present invention. By "water source", it is meant the water used to soak the legumes or any water subsequently added to the soak water. The term "water source" refers to any source of water or moisture, including steam. Preferably, the water source is tap water, deionized water, distilled water or combinations thereof. Although the water may contain mineral salts, it is more preferable that the water not contain too large a mineral content. Thus, the water source also includes soft water.

The water used in the optional preconditioning step is clean. It may be soft water but more preferably the water utilized is hard water.

The inventors have found that the amount of calcium in the soak water in the first step has an ultimate effect on the frequency of flatus events after ingestion by the mammal, as well as on the texture of the product so produced. It is preferred, therefore, that the soak water used in the first step contains some calcium. Although the amount of calcium in the soak water in the first step may range from 0 ppm to about 120 ppm, it is preferred that the concentration of calcium in the initial soak water in step (1) ranges from about 30 ppm to about 100 ppm and most preferably about 50 ppm to about 75 ppm. However, after the first step and in the transition step and in step 2 and step 3, of the present process, if additional water is added to the soak water or if the soak water is changed, unless indicated to the contrary hereinbelow, soft water (e.g., water containing less than 90 ppm calcium) is preferred over hard-water (e.g., water containing greater than 200 ppm calcium). It is more preferred that the calcium ion concentration in any fresh water used in steps 2 or 3 and the transition step, as defined herein, of the present process is less than about 70 ppm and more preferably less than about 50 ppm and most preferably having about 0 ppm calcium. If the water from the water source contains too high a level of calcium, the calcium, if desired, can be removed by utilizing ion exchange filtration or passing the water through an ion-exchange column, or treating the hard water with zeolite, utilizing techniques known to the skilled artisan.

The age of the legume utilized in the process described hereinbelow may vary, e.g., from as young as about 1 day or about 1 week after harvesting to as old as two or three years after harvesting. There are differences in behavior between the younger and older legumes. For example, the older legumes will generally take longer to re-hydrate and to remove the flatulence-causing oligosaccharides therefrom, but they generally provide a better yield. In addition, the younger legumes exhibit better appearance due to a reduction of cracked and split legumes, e.g., beans, as well as a smoother, creamier texture after cooking. Although legumes of various ages may be used in the present process, it is preferred that the legumes utilized in the process described hereinbelow are less than about 13 months old, and more preferred that the legumes are less than about 6 months old and most preferred that the legumes are less than about 4 months old.

In addition, the moisture content of legumes utilized may vary. In particular, the moisture content of the legume is dependent upon several factors, such as the type of legume, the variety within a type, the growing location, harvest conditions and storage conditions, and the like. For example, with beans, it is typical to see dry beans ranging in moisture content from as low as 8% by weight to as high as 25% by weight. All of these legumes with their varying moisture contents are contemplated to be utilized in the present invention.

In addition, it is preferred that the legumes that are used are about the same temperature and are about 20–40° F. below room temperature. This can be achieved by storing the legumes, prior to being subjected to the process steps described herein, at a temperature ranging from about 35° F. to about 60° F. and more preferably about 40° F. to about 50° F. with the most preferred temperature being about 40° F. for a time sufficient for the legumes to reach an equilibrium temperature (thermal equilibrium). The storage facility in which the legumes are placed are those commonly used in the art and include, without limitation, vessels, containers, bins, rooms, buildings or other areas or containers commonly used to for purposes of storage and for equilibration of the temperature of food products. The amount of time required to achieve an equilibrium temperature within the ranges indicated hereinabove, may vary, depending on the amount of legumes to be stored, the size of the legumes, the size of the storage facility in which the legumes are placed for storage, and the like. However, one of ordinary skill in the art can determine the appropriate conditions, without an undue amount of experimentation to effect the legumes attaining the desired initial temperature. Equilibrating the temperature of the legumes prior to implementing the process steps described hereinbelow greatly enhances the attributes of the product obtained after cooking relative to the product obtained when the temperature of the legumes are not initially equilibrated to a temperature. For example the texture of the legume produced when stored and temperature equilibrated produces a legume having creamier texture relative to a legume not so treated.

The water bath used in the present process may be a tank or other container typically used in the industry for soaking legumes. It may contain a drain and/or be connected to the water source by a feed so that the rate of water entering and leaving the water bath can be controlled and/or monitored. The water bath may be heated by techniques known in the art, such as by steam, hot air, heater, heating element or hot plate and the like. It is preferable that the heating be controlled. It is also preferred that the heat be applied directly to the container and more preferably to the water directly, rather than the legume. Soaking can be effected by permitting the legumes to soak with or without stirring or agitation. If the water is stirred, the stirring device is one that is typically used in the industry. The water in the soak tank may be stagnant or flowing. It is preferred that the water in the bath is flowing. It is even more preferred that the water in the bath is recirculating. It is also preferred that the water bath be adiabatic.

The process of the present invention is explained in greater detail hereinbelow. However, before subjecting the legumes to the present process, as described herein, the legumes may optionally undergo preconditioning, which consists of optionally cleaning the legumes by conventional methods. The preconditioning step may include an optional pre-soaking. Moreover, if the preconditioned legumes are subjected to both cleaning and pre-soaking, the order is not critical, i.e., the cleaning step may precede the pre-soaking step and vice versa.

If the legumes are subjected to the optional preconditioning, they are cleaned by standard techniques known in the art. Stones, metals, twigs, twine, and other foreign matter are usually removed by passing the legumes through a filter. For example, in one embodiment, they are washed, such as by spray washing, to remove the foreign material. Then they are passed over a vibrating screen cleaner, in which the legumes pass through a screen, which has perforations or holes large enough for the legumes to pass through but not large enough for the stones and other large objects to pass through. Large objects are retained as the legumes fall through the first screen and are caught by a lower screen. Here, in this latter screen, the perforations in the screen are very small, so that the sand and/or dirt adhering to the legumes may pass through, but the legumes remain on the lower screen. These legumes may then be stored or be used immediately in the steps described hereinbelow.

For purposes of this invention, "a dry clean legume" is a legume from the field or storage in which the foreign material adhered to or associated with the legume is removed before undergoing any of the method steps of the present invention hereinbelow, i.e., prior to undergoing any significant preconditioning except that which is used in the cleaning step. Unless indicated to the contrary, the term "dry legumes" refers to a legume having the moisture content of a legume naturally found in the field or in storage, bins, containers or the like after harvesting. Finally, a "pre-soaked legume", as used herein, refers to a legume which has been subjected to cleaning pre-soaking. It is preferred that the legume utilized in the present process is a dry legume. It is more preferred that the legume utilized in the present process has a moisture content ranging from about 8% to about 15% by weight. It is even more preferred that the legume used in the present process is a clean dry legume. It is most preferred that the legume used in the present process is a clean dry pre-soaked legume.

The legumes may optionally be preconditioned by contacting them with water from a water source at about ambient temperature. Although the legumes begin hydrating in this preconditioning step the amount of hydration may vary, depending upon various factors, e.g., the age of the legume, the storage temperature of the legume, humidity, and the like. However, it is preferred that the legumes utilized in the process are less than about 1 year old after harvesting and that the legumes utilized are about the same temperature within the temperature ranges indicated hereinabove. It is preferred, therefore, that the amount of hydration in this step and in the first step of the present process is monitored and controlled. In a preferred embodiment, the legume is contacted with a sufficient amount of a water source (for preconditioning) for a sufficient period of time to produce substantially clean legumes. This is effected by using techniques known in the art. The dry legume can be contacted with a water source (for preconditioning) by any method known to the skilled artisan. Examples of useful methods include, but are not limited to, spraying, immersion, repeated dipping, misting, floating, diffusion, steam condensing or combination thereof, with immersion being the most preferred. The optional preconditioning is effected at a temperature less than or equal to the first temperature, and most preferably at ambient temperature.

Of course, the amount of preconditioning water source used and the period of time necessary for the dry legumes to be in contact with the preconditioning water source to produce the preconditioned legumes will vary depending upon the particular method used to contact the dry legumes with the preconditioning water source. Preferably, the ratio of preconditioning water source to dry legumes is at least about 2:1 to about 4:1 and more preferably from about 2.5:1 to about 3.5:1. Also, preferably, the dry legumes are contacted with the preconditioning water source for a period of time in the range of from about 1 to about 30 minutes and more preferably from about 2 to about 20 minutes and more preferably from about 2 to about 10 minutes.

The degree of turbulence in the preconditioning step affects the rate of hydration. An excessive rate of hydration during preconditioning can cause cracking. The rate of water flow around the legume in the preconditioning step can affect the texture, and especially the amount of cracking in the legume product after cooking. For example, an excessive rate of turbulence increases cracking in the legumes after cooking. It is preferred that in the optional preconditioning step, the rate of flow of water around the legume has a Reynold's number value less than about 2300.

The optionally preconditioned legumes are next subjected to the process of the present invention.

In the first step of the present process, after the optional preconditioning step(s), the legume is soaked and rehydrated in a water bath at the temperature described herein under conditions effective to produce a rehydrated legume having a moisture content which is at least 50% by weight of that of a fully hydrated legume.

As used herein, the term "full hydration" or "fully hydrated" or any synonym thereof, in reference to legume refers to the moisture level obtained by the legume after soaking in water for four hours at ambient temperature in water containing 90 ppm calcium carbonate.

As used herein, the moisture content of a 100% fully rehydrated legume is the amount of water by weight of a dry clean legume that is obtained after the legume is soaked for at least 4 hours at ambient temperature in 90 ppm calcium carbonate water. The moisture content of the legume at 100% rehydration can be easily determined. A sample of clean dry legumes of known weight, such as 400 grams, is placed in a water bath containing 90 ppm $CaCO_3$. The sample is completely immersed in the water and is soaked at ambient temperature for at least 4 hours. When the soaking is completed, the legumes are drained, i.e., the water is removed from the surface of the legume, e.g., bean, by draining or any other technique commonly used by the ordinary skilled artisan. The moisture content of the legumes in the water bath is determined by art recognized techniques and an average determined to obtain the average moisture content per legume at full hydration. This is the value used to measure the moisture content of a fully hydrated legume.

The water utilized in step 1 has the characteristics described hereinabove. The water utilized is clean.

The legumes are preferably substantially immersed in the quiescent water bath. Sufficient amount of water is present in the water bath to effect the increase in moisture content of the legumes in the bath. More specifically, the weight ratio of water to legume is sufficient to rehydrate the legumes to attain the moisture levels described herein. Preferably, the weight ratio of water to dry legumes in step 1 ranges from about 1:1 to about 10:1, and more preferably from about 1:1 to about 8:1 and most preferably from about 2:1 to about 4:1.

As indicated hereinabove, the legumes are subjected to a first temperature, the temperature of the water bath being greater than or equal to ambient temperature but less than the critical rehydration temperature. The legumes are soaked in the water bath at the preferred temperatures under conditions effective to rehydrate the legume so that the moisture content of the legume is at least 50% of full hydration.

As used herein the term "critical rehydration temperature" is that temperature at which dry legumes soaked in water weigh less than an identical batch of dry legumes soaked in the same water bath at a lower temperature. The critical rehydration temperature is characteristic of each species of legume. For example, the critical rehydration temperature for navy beans, as shown hereinbelow, is about 130° F. However, this value may be the same or different for another type of legume.

The critical rehydration temperature is either known or can be easily determined experimentally. For example, it can be determined by placing a sample of known quantity of dry cleaned legumes (e.g., 400 g) in a known volume (e.g., 2000 ml) of fresh soft water containing 90 ppm calcium and soaking the legumes for 30 minutes at various temperatures ranging from ambient temperature to about 200° F. After soaking for thirty minutes at each temperature, the water is removed from the surface of the legume (e.g., by draining or any other techniques commonly used by the skilled artisan), and the legumes are weighed. The inventors noted that the weight of the 30-minute soaked legumes increases with increasing temperature until the critical rehydration temperature is attained. At the critical rehydration temperature, the weight of the 30-minute soaked legumes is less than the weight of an initially identical batch of dry legumes soaked at a temperature lower than the critical rehydration temperature. Thus, the lowest temperature at which this loss of weight in the legume is observed is the critical rehydration temperature.

The following illustrates the concept. 400 g of dry navy beans were soaked at various temperatures in 90 ppm $CaCO_3$ water for 30 minutes. The weights were measured at the various temperatures.

The values are tabulated hereinbelow:

| SOAK WATER TEMP ° F. | WEIGHT OF 400 g DRY NAVY BEAN AFTER 30 MINUTES SOAKING |
| --- | --- |
| 125 | 730 |
| 128 | 742 |
| 130 | 718 |

Since the weight of the navy beans at 130° F. is less than the weight at 125° F. and 128° F., it is readily apparent from the data that about 130° F. is the critical rehydration temperature of navy beans.

Thus, the legumes are subjected to a temperature ranging from about at or above ambient temperatures to a temperature less than the critical rehydration temperatures. Without wishing to be bound, it is believed that the critical rehydration temperature is the temperature at which new cell wall structure in the legume begins to form.

In a preferred embodiment, it is preferred that the temperature of the water bath ranges from about 90° F. to about 5° F. below the critical rehydration temperature of the legume and more preferably from about 95° F. to about 7° F. below the critical rehydration temperature of the legume. It is even more preferred that the temperature of the water bath is heated from about 35° F. below the critical rehydration temperature to about 5° F. below the critical rehydration temperature and more preferably from about 25° F. below the critical rehydration temperature to about 7° F. below the critical rehydration temperature and most preferably from about 20° F. below the critical rehydration temperature to about 10° F. below the critical rehydration temperature. For instance, for legumes, e.g., navy beans, it is preferred therefore that the temperature of the water bath in the first step ranges from about ambient temperature to 130°, and more preferably from about 95° F. to 125° F., and even more preferably from about 105° F. to about 123° and most preferably from about 110° F. to about 120° F.

The soaking in the first step may be effected at one temperature such as, for example at 115° F. or at more than one temperature, as long as the maximum temperature does not exceed the critical rehydration temperature, e.g., in legumes, e.g., navy beans, the maximum temperature should not exceed about 130° F. Thus, in this first step, soaking may be effected at two different temperatures, e.g., 95° F. and 123° F. As used herein when using the term first temperature, it is to be understood that the term encompasses one temperature or a plurality of temperatures within the specified range.

The amount of time required for the first step is dependent upon general factors, including, but not limited to the temperature of the water bath, the type of legume, age of the legume, storage condition of the legume and the like. Nevertheless, the soaking is conducted at this first temperature under the conditions described hereinabove until the moisture content of the legumes is at least 50% of that of an identical batch of fully hydrated legumes. It is preferred that the legumes, especially navy beans, are soaked at the first temperature for about 10 minutes to about 90 minutes and more preferably from about 45 minutes to about 70 minutes.

The soaking is conducted at the first temperature under the conditions described hereinabove until the legumes attain a moisture content of at least about 50% by weight of that of a fully hydrated legume, as defined herein, and more preferably at least about 60% by weight of that of a fully hydrated legume and even more preferably at least about 75% by weight of that of a fully hydrated legume and especially of at least about 80% by weight of a fully hydrated legume and more especially at least about 85% by weight of a fully hydrated legume and most preferably at least about 90% by weight of that of a fully hydrated legume. The moisture content may be up to about 100% by weight of a fully hydrated legume, as defined herein. Preferably, the moisture content of the legume so treated ranges from about 60% to about 99% by weight of a fully hydrated legume and more preferably from about 85% to about 99% of a fully hydrated legume and more preferably from about 87% to about 97%. For example, in some legumes such as navy beans, full hydration is achieved when the moisture level is within the range of 48%–60% by weight of the legume. The inventors have determined that in legumes, especially the genuses mentioned hereinabove, including the genus Phaseolus, (e.g., pinto, navy beans, Great Norther bean and the like) and the genus Vigna, (e.g., black eye beans the like), the critical rehydration moisture level ranges from about 40% to about 65% by weight and more preferably from about 50% to about 60% by weight and most preferably from about 52% to about 58% by weight of the legume. Thus, it is preferred that in the first step, the moisture content of the legume is increased to at least 35% and less than about 60% by weight, preferably from about 40% by weight to about 58% by weight. In a more preferred embodiment, the moisture content is at least 45% by weight of the legume and most preferably from about 50% to about 58%.

The present inventors have developed another method for determining the time that the first step is conducted.

More specifically, the inventors have noted that the rehydration of the legumes occurs in two noticeable phases. When the legumes are soaked at a constant temperature, initially, the moisture content of the legume increases quickly, but at a certain level, the moisture content of the legume begins to level off. The rate of increase of the moisture content of the legume in the first phase is substantially greater than that of the second phase. If a plot is made of moisture content of the legumes versus soak time, it is readily seen that the rate of increase of the moisture content in the first phase is substantially linear. However, when the moisture content reaches a critical moisture level, then the rate of increase in the moisture content begins to change to a value which is substantially smaller than that in the first phase. Surprisingly, the rate of increase of the moisture content in the second phase is also linear starting from the transition critical moisture level, but the slope of this line is not as steep as that of the first phase. More specifically, the slope of the rate of increase of the moisture content in the second phase is relatively small, in fact, although it is not horizontal, its slope is substantially or very close to zero. On the other hand, the slope of the first line representing the initial rate is substantially steeper. The inventors have determined that the transition point wherein the rate (increase of moisture content per unit time) changes is a critical parameter in this embodiment and have termed it as the critical moisture level, i.e., the minimum moisture level that the legumes must achieve before the second step of the process described hereinbelow is commenced. This critical moisture level corresponds to the critical rehydration level. Inasmuch as the change in weight of the soaking legumes is proportional to the increased moisture content of the legumes, this same phenomenon may be illustrated by plotting time versus the weight of legume. For example if 400 g dry pinto beans are soaked at 115° F. for 148 minutes, one obtains the following data:

| Time (min) | 6 | 24 | 41 | 58 | 76 | 94 | 112 | 129 | 148 |
|---|---|---|---|---|---|---|---|---|---|
| Weight (g) | 402 | 438 | 486 | 524 | 576 | 612 | 662 | 688 | 716 |

Plotting weight versus time, it is noted that the line is relatively linear until 112 minutes, and then the slope begins to change. Thus, the moisture level at 112 minutes is the critical moisture level for pinto beans at 115° F.

When the moisture level reaches at least 50% of full hydration by weight or at least about 40% by weight of the legume, then the first step is completed.

The first step also affects the textural quality of the legume. In a preferred embodiment, the soaked, uncooked legume is noticeably softer, relative to the dry legume.

The inventors have noted that simultaneously with the attainment of the critical moisture level or shortly thereafter soluble solids, e.g., oligosaccharides and other sugars, such as fructose, sucrose and the like, begin to diffuse from the legume. As a result the inventors have noted that the brix of the water bath in which the legumes are soaking increases. The inventors have also noted that prior to attaining the critical moisture level, the brix of the soak water is constant. It is preferably about zero. However, after attaining the critical moisture level, the inventors noted that the brix value increased to a value greater than zero.

Thus, one indirect method for determining the length of time it takes to achieve the critical moisture level is to monitor the brix of the soak water containing the soaking legumes. The inventors have found that legumes do not release the soluble solids until the critical moisture level is achieved.

Thus, in one embodiment of the present inventors, the legumes are subject to the first temperature until the critical moisture level is attained.

The present inventors have devised a test which indicates the length of time that the legumes should be maintained at the first temperature which is based upon the brix of the water bath in which the legumes are soaked. More specifically, in this embodiment of the present invention, the legumes are maintained at the first soak temperature until a change in the brix is noted. When there is a measured increase in brix level, then in this embodiment the first step is terminated and the second step is commenced.

Without wishing to be bound, it is believed that the change in the brix represents the initial diffusion of the sugar solids, such as oligosaccharide and other sugars such as sucrose and fructose and the like, from the legume into the water bath in which the legumes are soaking.

Thus, when the legumes are first subjected to the present process, the brix of the soak water is measured and monitored. The brix of the soak water is periodically measured until there is noted an increase in the brix level. When this occurs, the soak temperature is then raised to the second temperature, as defined herein.

The inventors have noted, however, that a large difference in temperature between the first and second temperatures may subject the legumes to unnecessary stress which results in increased cracking of the legume after cooking. To minimize the stress and to avoid a dramatic temperature change prior to raising the temperature of the soak water to the second temperature, the soak water is optionally raised to a transition temperature which transition temperature is between the first and second temperatures.

The soak water is maintained at this temperature at least until thermal equilibrium is established. At thermal equilibrium, the temperature of the legume is the same as the soak water. Typically, when the soak water is heated quickly, the temperature of the legume lags behind the temperature of the soak water. Obviously, the temperature outside the legume will be warmer than inside the legume. However, if the soak water remains at a constant temperature for a sufficient period of time, the temperature of the outer surface of the legumes will be the same temperature as the soak water and the temperature inside the legume is the same as outside the legume and thus is the same as the soak water. The amount of time it takes for thermal equilibrium to be obtained depends on various factors, including, without limitation, the bean type as well as the size of the legumes. Moreover, to minimize the soak water having areas of non-uniform temperatures, it is preferred that the water in the soak tank is flowing or mixed, rather than being stagnant.

Obviously, there is a minimum amount of time required to achieve thermal equilibrium. On the other hand, theoretically, there is no maximum time; once thermal equilibrium is obtained, maintaining the temperature of the water bath at one temperature for too long a period of time makes the present process less efficient. The present process is maintained at the transition temperature for a time sufficient to minimize stress, temperature shock to the legume and cracking of the legume (cooked bean).

The transition temperature is preferably greater than about 130° F. and less than about 150° F. The legumes preferably remain at the transition temperature for at least 15 minutes and no longer than 2 hours.

The transition temperature may be more than one temperature, as long as the values of the transition temperature are greater than the first temperature and less than the second temperature.

However, it is critical that the first and transition temperatures be within the temperature range described hereinabove. Heating the legumes to a higher temperature will have an adverse effect resulting in a product that does not have the characteristics described hereinabove.

In an alternative optional step, the temperature of the soak water heating is increased slowly to minimize temperature shock to the legumes. The soak water is heated at a rate sufficiently slow to minimize stress on the legume and to minimize cracking of the legume after cooking. It is preferred that the temperature of the soak water be raised no faster than about 5° F./min and more preferably no faster than 3° F./min and most preferably no faster than 2° F./min.

In step two of the process, the legumes in the soak water are heated to a second temperature, which is higher than the first temperature and higher than the critical rehydration temperature and but which is at about or greater than the endogenous oligosaccharide-reducing enzyme inactivation temperature. By "about", it is meant that the second temperature may be at or a few degrees below the inactivation temperature of the endogenous oligosaccharide reducing enzyme. Preferably, the second temperature is also below blanching temperatures and especially less than maximum starch gelation temperature. The legumes in the second step are subjected to the conditions described herein to increase the moisture levels of the legume to greater than that obtained at full hydration. Preferably, the moisture content of the legume ranges from about 101% to about 120% by weight relative to a fully hydrated legume, and more preferably from about 105% to about 115% by weight, relative to a fully hydrated legume, as defined herein and most preferably from about 107% to about 113% by weight relative to a fully hydrated legume as defined herein. It is preferred that the moisture content of legumes, such as navy beans after this step in the process is greater than about 56%–60% by weight.

As used herein with respect to the second temperature, the term "about" when used with the "enzyme inactivation temperature" refers to the temperature of the soak water being within a few degrees thereof. As explained hereinbelow, the enzyme inactivation temperature is either known or can be determined, as explained hereinbelow without an undue amount of experimentation.

The second temperature may thus be below or above the enzyme inactivation temperature, for example, but only by a few degrees. If the second temperature is above the enzyme inactivation temperature, it is preferred that the second temperature is no more than 15° F. above this enzyme inactivation temperature and more preferably no more than about 10° F. above and most preferably no more than about 5° F. above this enzyme inactivation temperature. If the second temperature is below the enzyme inactivation temperature, it is preferred that the second temperature be within about 5° F. of the inactivation temperature and more preferably no more than about 3° F. below the inactivation temperature of the enzymes. In a preferred embodiment, the second temperature is equal to the enzyme inactivation temperature or above the inactivation temperature by no more than 10° F., and it is even more preferred that the second temperature is at the enzyme inactivation temperature or no more than about 5° F. above the enzyme inactivation temperature.

Thus, in an embodiment of the present invention, the second temperature of the soak water is raised to about the enzyme inactivation temperature. Preferably, in this embodiment, the second temperature of the soak water is less than about 5° F. and most preferably less than about 3° F. lower than the enzyme inactivation temperature.

For purposes of this specification, the endogenous oligosaccharide-reducing enzyme inactivation temperature is that temperature in which the enzyme is substantially inactive after being exposed to that temperature for at least 4 hours.

The enzyme inactivation temperature for the endogenous oligosaccharide reducing enzyme for each species of legume is either known or is very easily determined experimentally. For example, one such protocol is as follows. A sample of known weight, for example, 400 g, of dry legume is soaked in a known volume of fresh soft water, e.g. 1600 mL, at various temperatures between ambient and 200° F. for at least 4 hours at each temperature. At the end of the prescribed time, the legumes are drained and the total oligosaccharide content in the legume is determined. As the skilled artisan expects, the percent by weight of remaining oligosaccharide in the drained legumes after at least a 4 hour soak at said inactivation temperature will be significantly greater than the percent of remaining oligosaccharide from the same batch of dry legumes soaked at a temperature just below the inactivation temperature. Those skilled in the art recognize that a naturally occurring enzyme system is most active across a narrow range of temperatures just below the inactivation temperature. As used herein, the inactivation temperature is the first temperature greater than the highest temperature in the most active temperature range at which the enzyme becomes increasingly inactivated, that is, the difference in value in % oligosaccharides remaining in the legume at a temperature just below the inactivation temperature and the activation temperature is significant. For example, when the inactivation temperature of the naturally occurring oligosaccharide-reducing enzyme in navy beans (which, without wishing to be bound, is believed to be α-galactosidase) was investigated, the results are tabulated hereinbelow. For purposes of illustration, the % oligosaccharides in the legume were measured after different times to show the generality of the trend:

| SOAK TEMP ° F. | % OLIGOSACCHARIDES REMAINING IN NAVY BEANS AFTER SOAKING | | |
|---|---|---|---|
| | 4 hours | 7 hours | 24 hours |
| 100 | 1.19 | 1.02 | .36 |
| 110 | 1.04 | .79 | .18 |
| 120 | 0.81 | .42 | .06 |
| 130 | .41 | .22 | .10 |
| 140 | .30 | .24 | .11 |
| 150 | .37 | .31 | .26 |

For navy beans, as shown by the data, the optimum activity range for the endogenous oligosaccharide reducing enzyme is from 120° F. to less than 150° F. Between 140° F. and 150° F. in all three cases, the oligosaccharides remaining in the navy beans increased dramatically, and that was the first time in this set of data that such a dramatic increase in the % of oligosaccharide was observed. The enzyme inactivation temperature for navy beans, based on the above data, is between 140° F. and 150° F.

The upper temperature for this step is the maximum starch gelation temperature. These values are either known to the skilled artisan or can be easily determined using techniques known in the art. See, e.g., the Ph.D. Thesis of Yong Soo Chung, 1996, submitted to Michigan State University, pp. 60–64 and the article by Schoch and Maywald, in *Cereal Chem.*, 1968, 45, 564–568, the contents of both of which are incorporated herein by reference.

In a preferred embodiment, the water bath in the second step is heated to a temperature ranging from about 140° F. to about 165° F. and more preferably from about 143° F. to about 160° F. and most preferably from about 145° F. to about 155° F.

As with step one hereinabove, the legumes in step two may be subjected to more than one temperature in the temperature range indicated hereinabove, as long as the temperatures do not exceed the upper and lower limits. As defined herein, when referring to the second temperature, it is to be understood that the term encompasses one temperature or a plurality of temperatures within the temperature range, as defined herein.

The legumes are subjected to the conditions described hereinabove in step two for a period of time effective so that the moisture content of the legumes is within the prescribed ranges indicated hereinabove. The preferred length of time in Step 2 is as short, as possible. The times vary depending on the type of legume and size. The legumes are soaked for a time sufficient to achieve the moisture levels indicated. Alternatively, without wishing to be bound, it is believed that the legumes are soaked at the second temperature to maximally swell the legume and to enhance internal porosity thereof. The Step 2 times balances the need to swell the legumes to create internal porosity (more time) with the need to minimize the amount of oligosaccharide reducing enzyme that is permanently inactivated (less time/lower temperature).

Preferably the legumes will achieve the above-identified moisture levels after soaking under the conditions described in the second step in about 15 to about 60 minutes and more preferably from about 30 to about 50 minutes. However, times vary by type of legume.

Without wishing to be bound, it is believed that in this second step, the legumes generate significant internal open volume by swelling to create and enhance internal porosity and loss of sugar solids. As a result, it is believed that the protein structure around the starch in the legume has less of a tendency to coagulate, encapsulate or aggregate, thereby permitting the starch granules to have unhindered access to water. Thus, they can more fully swell during subsequent cooking. Consequently, crystalline discrete starch particles in the legume, which are not digestible by mammals, are maximally converted to amorphous starch granules which are digestible by mammals. It is to be noted that not all of the starch in the legume is gelatinizable, however, by subjecting the legumes to these conditions described hereinabove in the first and second steps, the gelation of substantially all of the starch granules which are gelatinizable is maximized.

However, without wishing to be bound, it is also believed that by raising the temperature of the soak water bath to the second temperature also creates a sufficient shock to the legume, to disrupt the internal cell walls and not weaken the skin membrane.

However, the duration of the temperature shock of the second temperature is minimized to minimize the loss of enzyme activity. Thus, there is a balance between the length of time at the second temperature and the differential in temperature from the first step or transition step to the second step.

The balancing referred to hereinabove is complex. Without wishing to be bound, it is believed that soaking at the first temperature, e.g. 115° F., releases phytic acid and phosphate and accelerates weight gain. The legume thus swells at the fastest possible rate without creating pectate structure or activating the phytase enzyme. In the transition step (or if no transition step at the end of step 1), the phytase is inactivated and the beans are further swelled as calcium pectate structure is formed. The rate of this swelling is maximized, without inducing excessive cracking. Soaking at the second temperature, as defined herein, e.g., 145–155° F., accelerates sugar leaching of the legume. It is believed that changes in the sugar content and the weight of the legume materially affect the porosity of the legume. This has the practical effect of lowering the oligosaccharide concentration starting point for subsequent enzymatic oligosaccharide reduction. However, the objective is to minimize the time at the temperatures in steps 1 and 2. For example, if the temperature at step 2 is too long, then more and more oligosaccharide reducing enzyme is inactivated, thereby making it less available for use in step 3. it is believed, that too much time at the first temperature releases too much acid, thereby promoting premature protein coagulation. The balance is between excess premature protein coagulation and increased porosity and low oligosaccharides.

In step 3, the enzymes are given sufficient time to reduce the remaining oligosaccharide levels in the legumes to the desired levels.

In step three of the present process, the legumes prepared from the second step are heated to a third temperature which is greater than the first temperature and greater than the critical rehydration temperatures but less than the inactivation temperature of the naturally occurring oligosaccharide reducing enzyme as defined herein. If the second temperature is greater than or equal to the inactivation temperature of the naturally occurring oligosaccharide, the third temperature is less than the second temperature. If the second temperature is less than the inactivation temperature of the enzyme, the third temperature may be the same temperature as and more preferably less than the second temperature. Preferably, in the third step in the process, the temperature is lowered to a temperature in the range indicated herein to permit the naturally occurring oligosaccharide-reducing enzyme in the legume to digest the flatulence-causing oligosaccharides. Thus, the soak water is heated to a temperature which is effective for the naturally occurring oligosaccharide-reducing enzyme to digest the flatulence-causing oligosaccharides in the legume. It is preferred that the digestion occurs at the enzyme's maximum rate. The inventors have found that the preferred temperature of the third step ranges from about 125° F. to about 155° F. and more preferably from about 135° F. to about 150° F., with the most preferred temperature being about 143–147° F. As with the first step, the effective temperature may be one temperature or more than one temperature, as long as the maximum temperature is less than the inactivation temperature of the naturally occurring oligosaccharide reducing enzyme. Thus, when referring to the third temperature herein, it is to be understood that the third temperature may be one temperature or a plurality of temperatures, within the temperature range as defined herein.

It is believed that there are various phenomena occurring during this step. For example, without wishing to be bound, it is believed that some of the oligosaccharides in the legume are still diffusing into the soak water. As one would expect, the rate of oligosaccharide diffusion from the legume into the soak water is temperature dependent and is also greatest at the beginning of this step, but the rate decelerates as the soaking continues and as the amount of oligosaccharides that diffuse out of the legume approaches the concentration thereof in the soak water, i.e., at equilibrium. It should also be noted that as the concentration of oligosaccharides in the soak water increases, oligosaccharides will be diffusing back into the legume, with the rate of diffusion of oligosaccharides back into the legume increasing as the concentration of oligosaccharides in the soak water increases. In addition, the oligosaccharide concentration in the legume decreases as a result of concurrent enzymatic reduction of the oligosaccharides. At equilibrium, the rate of diffusion of sugar from the legume and the rate of diffusion of sugar into the legume are about the same. Equilibrium, however, is achieved substantially quicker than if diffusion were the only means of reducing the concentration of sugars in the legume, as a result of the enzymatic digestion of the oligosaccharides in the legume. Nevertheless, at equilibrium the oligosaccharide concentration in the soak water does not increase.

The amount of oligosaccharides that diffuses out of the legumes into the soaking water can be determined by art recognized techniques. For example, the total amount of the oligosaccharides present in the various legumes is generally known. For example, it is known that the common bean contains 4.90% (w/w) sugar, 1.25% (w/w) sucrose, 0.45% (w/w) raffinose, 1.80% (w/w) stachyose, and 0.25% (w/w) verbascose. The oligosaccharide content of other common legumes are listed in a table on Page 27 in S. S. Abdel Gawad, *Food Chemistry* 1993, 46, 25–31, the contents of which are incorporated herein by reference. The amount of oligosaccharide leached from the legume, e.g., bean, is determined by measuring the oligosaccharides present in the soak water at various time intervals during successive soaks by techniques known in the art, such as by liquid chromatography.

The legumes are maintained at this third temperature for a sufficient amount of time to permit the flatulence-causing oligosaccharides present in the legume to be substantially removed. It is preferred that the oligosaccharide concentration thereof in the legume product produced by the present process is less than about 0.5% by weight of the original dry weight and more preferably less than about 0.05% of the original dry weight and even more preferably less than 0.025% by weight and most preferably about 0% by weight of the dry weight of the legume. In a more preferred embodiment, the concentration of raffinose and verbascose in the legume is about 0% by weight and the amount of stachyose is less than 0.5% of the dry weight of the legume. Preferably, the stachyose concentration is less than about 0.05% by weight of the legume and more preferably less than 0.025% by weight.

The effective conditions of this step are such so as to permit the naturally occurring enzyme in the legume to digest a substantial amount of the remaining flatulence-causing oligosaccharides present in the legume, while simultaneously permitting additional oligosaccharides to diffuse into the soak water.

The present inventors have found that the enzymatic digestion of the oligosaccharides is most effective when the pH of the soak water is about or near neutral or slightly acidic. More specifically, it is preferred that the pH of the water bath ranges from about 5.0 to about 9.0 and more preferably from about 5.5 to about 9.0 and most preferably from about 6.0 to about 7.0. In order to maintain the pH within these ranges, a buffer known to the skilled artisan may optionally be added to the soak water in amounts effective to maintain the pH in the range indicated under the conditions of the third step of the present process. If a buffer is utilized, it is preferred that it is prepared using soft water. However, a buffer is usually not present, since during the process of the present invention the pH is normally in the ranges specified hereinabove.

The soaking in the third step is effected by permitting the legumes to soak with or without stirring in circulating or non-circulating water. If the legumes are mixed or stirred, agitation or mixing is effected by using a stirring device known in the art. Water may be either stagnant or flowing. Although the water utilized may contain mineral salts, it is preferred that the water used is tap water, deionized water or distilled water or combination thereof. If tap water is utilized, it is preferred that soft water be utilized. It is preferred that the amount of calcium present in the water is minimal; in fact, the attributes of the water described hereinabove are also applicable in this step. Again, it is preferred that the legumes be substantially immersed in the water. The water to legume weight ratio may be the same or different than that utilized in the first step. More specifically, in the third step, it is preferable that the weight ratio of water to dry legume ranges from about 1:1 to about 5:1, and more preferably from about 2:1 to about 4:1 and even more preferably about 3:1.

At the end of the third step, substantially all of the oligosaccharide concentration in the legume seed has been removed. By "substantially", it is meant that at least 90% of the oligosaccharide content has been removed from the legume seed, and more preferably greater than about 95% and most preferably greater than about 99% of the oligosaccharide content has been removed from the legume seed. It is preferred that after step 3 of the instant process, the oligosaccharide content is about 0% (i.e., less than an amount ranging from about 0.5% to about 0.05% by dry weight of the legume).

It is preferred that the soaking legumes e.g., navy beans, will be heated at the third temperature range for about 1 to about 3 hours, and more preferably for about 2 hours. However, some larger legumes, such as garbanzo and pinto beans, take considerably longer to soak than others, such as navy beans.

It is to be noted that the legumes may be soaked in the water for times longer than that indicated hereinabove, especially if the soaking occurs at lower temperatures, for heating generally increases the rate of oligosaccharide removal. However, if the legumes are soaked for more than the above-specified time, the present process would become less efficient. The present inventors have found that as the amount of soak water increases, the greater is its holding capacity for the leached components, i.e., the flatulence-causing oligosaccharides as well as other solubles, e.g., calcium. In addition, the greater the amount of soaking water present, the faster is the initial leaching rate.

The present inventors have found that if too much water is added, however, the process starts to become less efficient, and there is relatively little additional benefit to use water in those amounts. Thus the effective conditions are such so as to permit the naturally occurring oligosaccharide-reducing enzyme to digest flatulence-causing oligosaccharides present in the legume, while simultaneously permitting the oligosaccharide concentration in the soak water to increase by diffusion of the sugar from the legume into the soak water containing the legume.

During the third step of the process, it is preferred that the water bath be changed with fresh water or that fresh water be added to the soak water at least once, as described hereinbelow; it is more preferred that water is simultaneously bled into and out of the soak tank. It is also preferred that the water bath be changed one or two times, as described hereinbelow. More specifically, during the water bath exchange with fresh water in the third step of the process, it is preferred that fresh water is bled into the soak water substantially continuously. While a low bleed rate has little effect on bean cracking, a high bleed rate increases legume cracking. A preferred minimum bleed rate ranges from about 1% to about 30% per minute, and more preferably from about 1.5% to about 2.5% per minute wherein % indicates the amount of fresh water divided by the amount of free water in the same apparatus. Free water, as used herein, is the total volume of the soak apparatus minus the volume of the bean.

The next step, step 4 in the process, is optional; the legume may optionally be blanched under effective blanching conditions. The present inventors have found that the blanching temperature is below the boiling point of water. Preferably, if conducted, the blanching is performed at temperatures ranging between about 155° F. to about 210° F. and more preferably from about 165° F. to about 190° F., and most preferably from about 170° F. to about 185° F. These temperatures are maintained for a time sufficient to ensure that the entire legume is maintained at that temperature. The legumes are preferably blanched for a period of time in the range from about 1 to about 20 minutes, and more preferably from about 2 to about 10 minutes and most preferably from about 3 to about 7 minutes. The legumes after the blanching step are firmer than prior to this step. The pH of the unbuffered water in the blanching step is about the same as that of the third step.

It is believed that during the blanching step, many different phenomena are occurring. More specifically, without wishing to be bound, it is believed that in the blanching step, the pectin methyl esterases (PME) are denatured and rendered ineffective. As described hereinbelow, PME catalyzes the reaction of calcium with the endogenous pectin present in the legume in both the skin and meat of the legume, forming calcium pectate cross-links. These cross-links are impermeable to water and form a barrier that inhibits migration of material to and from the legume. Moreover, it is believed, without wishing to be bound, that PME catalyzes the formation of calcium crosslinks on the outside of the starch granule, thereby also preventing the starch granules from fully gelatinizing. Thus, by denaturing the PME, it is believed, without wishing to be bound, that the starch granules can more freely swell with less hindrance.

Without wishing to be bound, concurrent with the PME denaturation, it is believed that two other reactions of significance occur, continuing starch gelatinization and protein coagulation. Without wishing to be bound, it is believed that during the blanching step, the starch granule continues to swell as it transitions from a crystalline granule to an amorphous gel, making the legume more digestible. In addition, it is believed, without wishing to be bound, that protein coagulation occurs concurrently or shortly thereafter. This protein coagulation is important in preventing the starch from excessively leaching out of the legume during the retorting/cooking operation. There may be some starch leach from the legume during the preservation process, however, the conditions of this process are such so as to prevent an excessive amount of starch to leach from the legumes. During blanching, the legumes are also subjected to a temperature effective to coagulate a sufficient amount of protein to prevent an excessive amount of starch from leaching out of the legume during the cooking step.

In addition to blanching, the legumes may be optionally subjected to surface treatment to improve skin and meat texture. This surface treatment can be effected at any of the steps described hereinabove and is preferably performed before or during the first step as described hereinbelow, or even more preferably during or after step 3. The legumes may be soaked or rinsed with water containing conventional chelating agents, such as alkali metal salts of ethylene diaminetetraacetic acid (EDTA), alkali metal metaphosphate, alkali metal pyrophates, or tripolyphosphates or citric acid or alkali metal salts thereof. Preferably, the chelating agent is present in the rinsing water in concentrations of from about 0.1 to about 5% by weight and more preferably from about 0.2% to about 2% by weight. Preferably, the legumes are rinsed with the water containing the chelating agents for a time sufficient to achieve the desired skin and meat texture, e.g., about 4 to about 180 minutes, more preferably from about 12 to about 60 minutes and more preferably from about 15 to about 30 minutes. The amount of time varies with the concentration of the metal chelating agent and in which step the chelator is added.

The inventors have found that the addition of the metal chelating agents after the blanching step (or after step 3, if there is no blanching step) also enhance oligosaccharide removal from the legumes and helps reduce trace amounts of oligosaccharides to nil. Moreover, if the chelating agent is used after the third step, it is preferred that it is present in the rinsing water at concentrations of from about 0.1% to about 2.5% and more preferably from about 0.1% to about 1% by weight and more preferably, at about 0.5% by weight of the soak water. If the legumes are rinsed with the chelating agents after step 3, it is preferred that the legumes are rinsed with the chelating agents for about two to about thirty minutes and more preferably from about four to about twenty minutes.

In addition, the use of chelating agents also enhances the texture of the legume, and improves the organoleptic properties, including the meat and skin texture, the meld, and the like. Without wishing to be bound, it is believed that the outer skin membrane is softened by the phosphate or other metal chelating agent which enhances mass transfer through the membrane and thus reduces the time to eliminate flatulence-causing oligosaccharides from the legumes. It should be noted that prior to the preservation process described hereinbelow, the calcium sequestering agent is rinsed off the legumes. This can be effected by changing the soak water, transferring the legumes in a pumped water loop and the like, or by actually rinsing the legumes before the preservation step.

The present inventors have noted that the use of the metal chelating agent provides a legume in which the organoleptic properties match that of commercially processed legumes, e.g., canned or frozen legumes. These legumes so treated have the color, appearance, texture and taste of commercially sold legumes in the United States.

During chewing of the legume, the legume skin can separate therefrom. Loose skins have a particularly unappealing mouth feel. When chelating agents are used, the skin achieves a texture indistinguishable from the meat, as determined by trained sensory panelists and the overall taste and organoleptic properties of the legume are enhanced.

In an alternative embodiment, the chelating agent, such as metaphosphate, is dissolved in aqueous solution, such as water and is added to the soak water in Step 1. In this embodiment, it is found that the addition of chelating agent in step 1 increases the rate of hydration. It is preferred that the concentration of the chelating agent used in Step 1 ranges from about 0.5% to about 2.5% by weight of solution and more preferably from about 0.2% to 2.0% by weight of solution and most preferably at about 1% by weight of solution. In addition, it is preferred that the amount of chelating agent added to the soak water ranges from about 3 to about 5% per gram of legume.

Surprisingly, if the addition of chelating agents occurs after the optional preconditioning step and during Step 1, the rate of bean rehydration increases more than 50% in the first half hour of soaking. Without wishing to be bound, it is believed that the addition of the chelating agent increases the bean porosity.

In addition, additives conventionally used in this art may be added to the soak water or rinsing water in any or in all of the steps described hereinabove. For example, the pH of the soak water in any one of the steps may be controlled to a certain level, e.g., as in step three wherein the pH of the soak water is about 5.5 to 9.0. Depending on the value selected, this value may be attained directly with the addition of buffers conventionally used in the art.

Moreover, the soaking water in the first three steps as well as step four, and the transition steps and the other optional steps, if utilized, may contain additional optional ingredients normally used in this art, in preparing legumes, e.g., trace amounts (about 0.01 to about 0.05%) of a reducing agent, such as sodium or potassium salt of sulfite or bisulfite, cysteine, ascorbic acid, sodium mercaptoglycolate and combinations thereof, coloring agents, and the like. Alternatively, these agents may be added to the sauce described hereinbelow.

It is to be understood that the present process encompasses the addition of any one of the conventional additives described hereinabove or a combination of conventional additives to either the soaking water or to the rinsing water.

During the present process described hereinabove, the present inventors have found that the water may be changed during and after any step of the present process. Although it is optional to change the soak water after the first step, it is preferred that the soak water be changed at least once during step 2 and at least two times during the third step, especially when the concentration of the sugar in the soak water begins to decrease indicating that the sugars are diffusing back into the legume. As indicated hereinabove, during the third step, there are at least two phenomena occurring. First, the flatulence-causing oligosaccharides are diffusing out of the bean. As long as there is a larger concentration of the oligosaccharides in the legume than in the soak water, the oligosaccharide concentration in the soak water will increase from the diffusion thereof from the legume to the soak water. This differential in concentration between the legume and the soak water is the driving force for the diffusion. More specifically, the driving force for diffusion is to transfer soluble solids from high concentration zones to lower concentration zones. For purposes of discussion herein, if oligosaccharides are diffusing from the legume to the soak water, so that the net concentration of oligosaccharides in the soaking water increases, it is called a positive diffusion. Moreover, for purposes of discussion, this differential in oligosaccharide concentration in the legume relative to the soak water permitting the positive diffusion to occur is termed "a positive oligosaccharide concentration-reduction driving force." As more and more oligosaccharide diffuses from the legume, the concentration of the oligosaccharides in the soak water begins to approach the concentration of the oligosaccharide in the legume and the rate of diffusion slows down.

Additionally, there is a second phenomenon also occurring. The naturally occurring enzyme in the legume is breaking the oligosaccharide into simple sugars, thus reducing the concentration of oligosaccharide in the legume. Thus, the remaining flatulence-causing oligosaccharide in the legume will decline as the leaching action and enzymatic activity progress. At some time, the sugar content in the soak water will be approximately equal to the sugar content in the legume. At that point, as the skilled artisan will realize, the sugar concentration in the legume will decrease below the sugar concentration in the soak water with continuing enzymatic activity.

Once the concentration of these sugars in the legume drops below the sugar concentration in the soak water, the sugar in the soaking water will diffuse back into the legume because the driving force has reversed. As used herein, diffusion from the soak water back to the legume causing a net decrease in the sugar concentration in the soak water is called a negative diffusion.

Although the soak water can be changed any number of times to make the present process more efficient, the soak water should be changed only when necessary, i.e., at the time when the concentration of the sugar in the soak water begins to decline. This permits additional oligosaccharides to continue to leach from the legume into the soak water, thereby allowing the flatulence-causing oligosaccharide originally in the legume to leach into the water bath. If the same soak water were utilized during steps 1–4, then an equilibrium between the oligosaccharides in the legume and in the soak water would be attained, thereby limiting the amount of oligosaccharides being leached from the legume. By changing the soak water, especially when equilibrium in the sugars in the soak water and the legumes are attained, additional amounts of oligosaccharides can be leached from the legume into the water bath. This point wherein the concentration of the sugar in the soak water begins to decline can also be determined by measuring the brix. Brix is a well known refractive index measure of the soluble solids, e.g., sugars, in a liquid. As the sugars are diffusing out of the legume into the soak water, the concentration of the sugar increases and the brix increases. However, when the concentration of the sugar in the soak water is higher than that in the legume, the sugar in the soak water begins to diffuse back into the legume, and the brix of the soak water begins to decrease. The brix increases rapidly after soak water change, but the brix levels begin to flatten as equilibrium is approached, then declines as sugar is reabsorbed into the legume. The soak water is preferably changed when the soak water brix becomes substantially constant (i.e., indicates that equilibrium is almost achieved).

The new soak water will have initially a zero concentration of sugar and thus, there is a positive driving force again for the sugars to be leached from the legume into the soaking water.

Thus, during the entire process, and especially during the third step, it is preferred that there is a continuous and periodic monitoring of the brix in the soak water to determine when the brix of the soak water begins to decline so that the soak water can be changed. It is preferred that the brix be measured at least once every 15 minutes, and more preferably within every 1 minute with an online brix measuring device.

Under the conditions of the present process, however, in a preferred embodiment, the soak water should be clean when starting step one of the present process and the water is preferably changed at least once during step 2 and twice during step 3.

In steps 1, 2, and 3 the legume is intentionally over-hydrolyzed to achieve maximum starch swelling. However, if water is changed in the preconditioning step or during blanching, hard water is preferably utilized to intentionally firm the legume. Alternatively, calcium can be added to the sauce or other vehicle prior to or simultaneous with forming a legume-based mixture in a later step to achieve the desired firmness, as described hereinbelow. The ordinary skilled artisan will realize that the degree of hardness can be adjusted to achieve the desired tenderness of the legumes.

It should also be noted that it the water is changed or added to the soak tank in any of the other steps, e.g., steps 1–3 or the optional transition state, soft water is preferably utilized.

The legumes are next subjected to conditions sufficient to preserve the legumes, as described hereinbelow by standard techniques known in the art.

The usual type of preservation includes canning, freezing, drying, and the like. Initially the legumes so prepared are combined with a vehicle, as defined hereinbelow and mixed with optional ingredients, depending on the purpose, using standard techniques in the art. The legumes may also be used whole or crushed or mashed or dehydrated using techniques known in the art. Nevertheless, regardless of the preservation technique, the legumes are typically combined with a vehicle to produce a legume-containing mixture. The mixture may additionally contain foods typically included in such mixtures, e.g., meat, vegetables, and the like. Of course, the amount of legumes in the legume-containing mixture will depend upon the particular product being produced. Examples of legume-containing products that can be prepared by the process of the present invention include, but are not limited to, pork and beans, vegetarian beans, hot dog and beans, sausage and beans, chili with beans, baked beans, pre-cooked ingredient beans, bean salad, southern peas, bean soups, beans with meat, bean spreads, beans with cheese, beans with rice, flavored beans, beans with pasta, bean dips, bean casseroles, bean salsa, bean snacks, bean pastes, bean side dishes, bean flour, re-fried beans, bean powder, pet foods and the like; however pork and beans, chili with beans, and baked beans are preferred. The legume containing mixture preferably comprises from about 5% by weight to about 95% by weight and more preferably from about 15% by weight to about 75% by weight and most preferably from about 35% by weight to about 65% by weight of the legume produced in accordance with the present invention, with the balance being a vehicle.

When the legume-containing mixture is the preferred pork and beans, the mixture preferably comprises from about 25% by weight to about 85% by weight, more preferably from about 30% by weight to about 75% by weight, and most preferably from about 35% by weight to about 65% by weight of beans, prepared in accordance with the process described hereinabove, and the balance being the vehicle; when the legume-containing mixture is the preferred baked beans, the mixture preferably comprises from about 25% by weight to about 65% by weight, more preferably from about 40% by weight to about 60% by weight, and most preferably from about 35% by weight to about 50% by weight of beans, prepared in accordance with the process described hereinabove and the balance being the vehicle; when the legume-containing mixture is the preferred chili with beans, the mixture preferably comprises from about 10% by weight to about 40% by weight, more preferably from about 15% by weight to about 35% by weight, and most preferably from about 20% by weight to about 30% by weight of beans, prepared in accordance with the process described hereinabove, with the balance being the vehicle. These legume-containing mixtures may further comprise other ingredients, in addition to the foods described hereinabove, which are typically included in such mixtures. These type of ingredients and their relative concentrations will be known to one skilled in the art.

The term "vehicle," as used herein, refers to an edible medium that the legumes prepared in accordance with the present invention may be combined with. The vehicle can be any edible medium known to those skilled in the art. Furthermore, the vehicle may be a single component or ingredient, such as water, or may be a mixture of components or ingredients. Preferably, the vehicle is compatible with the particular legume prepared in accordance with the present invention being used. Examples of vehicles useful in the present invention include, but are not limited to, water, brine, a tomato-based sauce, a molasses based sauce, a brown sugar based sauce, chili sauce, barbecue sauce, smoke-flavored sauce, and baked bean sauce. The phrase "tomato-based sauce", as used herein, refers to the sauce used to prepare products such as pork and beans, hot dogs and beans, and vegetarian beans. The composition of such tomato-based sauce will be appreciated by one skilled in the art. The phrase "chili sauce", as used herein, refers to the sauce used to prepare chili-type products when combined with beans. The composition of such chili sauce will also be appreciated by one skilled in the art. The phrase "baked bean sauce", as used herein refers to the sauce used to prepare baked bean products when combined with beans. The composition of such baked bean sauce will also be appreciated by one skilled in the art.

The legume-containing mixture may additionally contain optional ingredients such as pork, beef, chicken, tofu or other soy derivatives, turkey, fish, spices, flavoring agents, tomato derivatives, dairy derivatives, grains, gums, starches, sugars, coloring agents, oils, salts, fruits, vitamins, vegetables, cereals, calcium sources, such as calcium chloride, phosphates, and mixtures thereof and the like. The concentration of each and all of these optional ingredients will depend upon the desired flavor profile and appearance of the final product, and will be appreciated by one skilled in the art.

The legume-containing mixture is prepared by combining the legumes prepared in accordance with the process described hereinabove with the vehicle, along with any desired optional ingredients. The ingredients may be added singularly or combined in any manner known to those skilled in the art. The preferred embodiment is to separately add each ingredient into a vessel or container. Thus, for example, the legumes prepared in accordance with the present invention, then other fresh ingredients, such as chopped onions or pieces of pork, and then the vehicle are sequentially added into a container. Another method is to add the various ingredients, separately or in combination, into an agitated tank, wherein they are stirred or agitated until the ingredients are uniformly dispersed through the legume-containing mixture. If necessary, to increase the firmness of the vegetable, sufficient calcium may be added to the legume containing mixture until the desired firmness is obtained.

After the legume-containing mixture is prepared, it is then preserved by the desired route using conventional techniques known in the art. For example, various methods known in the art are used to preserve the legume-containing mixture, such as retorting, refrigeration, irradiation, freezing, aseptic processing, microwave processing, dehydration, freezing-drying, acidification, pickling, and the like. For example, in freezing, the freezing may be accomplished by known techniques in the art, e.g., individually quick frozen techniques, freezing the legume in a container, e.g., blast freezing or immersion of the legumes into a freezing solution. In dehydration, water is removed from the legumes by applying heat thereto, using techniques known in the art, such as forced air drying, drum drying, spray drying, vacuum drying, freeze drying and the like. Heating may also be effected by solar heating techniques known in the art. In dehydration, if it is utilized, it is preferred that the legumes are dried in dehydrators. If dehydration is utilized, it is preferred that before dehydration, preservatives, such as sulfite (e.g., sodium sulfite or metabisulfite) be applied to any cut legume.

However, the most preferred preservation route is retorting. In this method, the legume-containing mixtures described hereinabove are charged into a container. Examples of typical containers include, but are not limited to, tin plates or steel cans with or without enamel linings or coating, aluminum cans, flexible or semi-rigid containers, glass bottles and jars, plastic bowls with or without lids, coated cartons, aluminum trays, flexible pouches, retortable containers and the like. The phrase "retortable container", as used herein, refers to a container which is capable of withstanding the temperature and conditions of a retort operation. The preferred container is the retortable container. The retortable container may be any type suitable for retort processing.

In the retorting preservation method, the legumes are thermally processed in a retortable container. More specifically, in the preferred embodiment, after the legume-containing mixture is prepared, it is charged into a retortable container, then sealed. After the retortable container is sealed, it is thermally processed. This is accomplished by heating the retortable container and the legume-containing mixture contained therein at a sufficient temperature and for a sufficient period of time to thermally process the legume. The time and temperature requirements are dependent upon the legume-containing mixture being thermally processed, the size, shape and composition of the retortable container, and the type of retort equipment used, which is easily determined by one skilled in the art.

The retort operation can be carried out in any retort equipment known to those skilled in the art. Examples of useful retort equipment include, but are not limited to, hydrostatic retorts, crateless retorts, rotary retorts, agitating retorts, and still retorts. As will be appreciated by one skilled in the art, and as already pointed out herein, the time and temperature parameters necessary to process the legume product will depend upon the type of retort equipment used.

Optionally, prior to retorting, the open retortable containers are filled with legumes prepared in accordance with the present invention in combination with the vehicle, and are placed on a conveyor of any suitable style and passed through an oven, as described in U.S. Pat. No. 1,718,187 to Bartlett, the contents of which are incorporated by reference. The temperature of the oven is preferably between 400° F. and 500° F. and more preferably at or about 450° F., and the legumes are subjected to the high heat of the oven for a time to sufficiently bake the legume in the open containers. Upon removal of the containers from the oven, a quantity of the vehicle is added to each container sufficient to compensate for vehicle lost by evaporation and absorption during the baking steps and sufficient to meet fill standards. The containers are next hermetically sealed and then thermally processed under retorting conditions known to the skilled artisan. Other methods for preserving are described in U.S. Pat. No. 2,232,282 to Struble, U.S. Pat. No. 1,495,736 to Hadley, U.S. Pat. No. 1,548,796 to Libby, U.S. Pat. No. 2,278,475 to Musher, and U.S. Pat. No. 2,360,062 to Lannen, the contents of which are all incorporated by reference.

It is well known that retorting increases the pressure on the legume inside the can. Moreover, it is believed that the pressure affects the extent of starch gelation. It is preferred that the pressure on the legumes in the can is such that starch gelation is maximized.

After retorting, the retortable containers are labeled and ready for distribution to the consumer.

As indicated hereinabove, the legumes may be prepared into a paste or puree. This is effected using techniques well known in the art. See U.S. Pat. No. 4,871,567, the contents of which are incorporated by reference. For example, prior to adding the legumes to the vehicle, the legumes may be crushed or mashed using techniques known in the art.

In addition, the crushed legumes may used as is or they may be mixed with whole legumes, such as in preparing refried beans. In preparing refried beans, the beans subjected to steps 1–3 and optionally step 4 described hereinabove are separated into two separate streams. One stream consists of the whole beans; while the other stream consists of the beans which are to be crushed or mashed. The first stream of beans (i.e., the beans which are to remain whole) may optionally be baked under normal baking condition.

The second subquantity of beans (beans to be crushed) are subjected to crushing using standard techniques in the art. After crushing, the second subquantity of beans may be mixed with the first quantity of beans (the whole beans) and then dried using techniques known in the art, such as that described in U.S. Pat. No. 4,871,567, the contents of which are incorporated by reference.

The legumes prepared by this invention can be used in foods fed to various kinds of mammals, including dogs, cats and other domestic and farm animals. However, preferably they are prepared for ingestion by man.

The legumes prepared in accordance with the procedures described hereinabove exhibit the characteristics described hereinabove, with legumes exhibiting very low flatulence. Additionally, the organoleptic properties of the legumes produced in accordance with this invention match that of commercially available processed legumes, e.g., canned or frozen legumes.

The inventors have noted the legumes produced in accordance with the present invention are superior to those produced in accordance with the procedure described in copending application, entitled, "A PROCESS FOR REDUCING FLATULENCE IN LEGUMES". The legumes produced in accordance with the procedure described therein were consistently soupy and soft. They did not have the appropriate texture with respect to the skin of the legume, the meat of the legume or meld. Moreover, they consistently exhibited greater than average cracking.

On the other hand, the legumes produced by the present invention exhibited less cracking. Furthermore, in a preferred embodiment, they exhibited the appropriate texture and organoleptic properties found in commercial process and legumes sold in the U.S.

The inventors have discovered that cracking is caused by a variety of factors. Without wishing to be bound, it is believed that the amount of soaking time, and the rate of rehydration during the first step and the temperature of the first step among other factors affect cracking. However, by subjecting the legumes to the conditions described herein, the amount of cracking in the legumes formed by the present process is minimized. In addition they have found that a rinsing with metal chelating agents may also reduce cracking.

The inventors have additionally noted that when the soak water in steps 1–3 described hereinabove is changed abruptly, i.e., when the old soak water is removed completely and then replaced with fresh water, the legumes develop increased and noticeable severe cracking (splitting) in the skin after cooking and processing. Normally, per 100 legumes, e.g., navy beans, there may be about 15% by count exhibiting severe cracking. However, when the soak water is changed abruptly, the amount of cracking is raised significantly, e.g., severe cracking (e.g., 50%) has been observed. However, when the soak water is changed gradually, an abnormally high amount of cracking in the legume does not occur. Thus, in a preferred embodiment, the legumes are soaked in a soak tank which has an outlet drain for water and an inlet pipe for water to be added wherein the rate of entry of the fresh soak water is controlled to minimize cracking. Without wishing to be bound, it is believed that this excessive cracking is due to the following phenomena: When the legumes are soaking in the present process, the legume is swelled with water. At the same time, there is considerable amount of sugar in the soak water as well as other components in the soak water. If the fresh water replaces the old sugar—containing water abruptly, e.g., by dumping out the sugar water and then replenishing with fresh water, there is a considerable change in the soak water brix, e.g., from a positive amount to zero. This represents a considerable change in osmotic pressure. This abrupt change in pressure pushes excess water into the legume, swelling it even further. If the swelling rate is excessive, the bean skin stretches beyond its yield point and creates a weakness in the skin. However, the cracking is minimized as the interior sugar more gradually migrates out of the legume and into the soak water.

Without wishing to be bound, it is believed that at high osmotic pressure differences, the swelling/deswelling response is so great that permanent damage is done to the integrity of the bean surface. Although the damage is not obvious to the naked eye during soaking, after being subjected to preserving conditions, such as retorting, which completes gelation swelling, the damage is visually apparent as increased fractioning of the bean. However, if the legumes, such as beans, are ultimately served as a puree or paste, the presence of cracking in the beans is unimportant, since in puree, the legume is mashed in any event, as described hereinabove.

On the other hand, if the legume is not to be mashed, then "cracking" detracts from the appearance of the legume. To avoid excessive cracking in the legume, the new soak water is added to the soak tank or container at a rate effective to minimize cracking. Preferably, the new soak water is added to the soak tank at a rate ranging from about 1%/min to about 4%/min. In this case, percent per minute means the fresh gallons added per minute divided by the total free gallons of water in the soak and balance tank system. Another way of measuring the rate is to analyze the change in soak water brix. The inventors have found that the cracking is minimized when the change in soak water brix is less than about −2.0 and more preferably less than about −1.0 per hour. When the rate of bleed-in of the new soak water is within the range indicated hereinabove, the present inventors have noted that the legumes obtained have less cracking than that obtained previously heretofore, although the actual rate bleed-in may vary for different legume varieties.

As indicated hereinabove, the operations of steps 1–3 and the optional transition step may be conducted in a soak tank conventionally used in the art. The soak tank may have a water inlet and drain. In addition, the soak tank may have the water stagnant, or the water may be stirred by conventional means or the water may be circulating. The soak tank may be a vertical soak tank typically used in the art.

In an even more preferred embodiment the operations in steps 1–4 are conducted in a horizontal flow soak tank apparatus, as described in copending application entitled "SOAK APPARATUS FOR LEACHING SOLUBLE CONSTITUENTS FROM INSOLUBLE MATERIALS, filed concomitantly herewith and based upon a provisional application having Ser. No. 60/116,709, the contents of both of which are incorporated by reference.

The horizontal soak tank apparatus is described therein. It comprises a series of screens which provide a substantially uniform flow of water through the horizontal soak tank. Moreover, the horizontal tank is optionally connected to a balance tank for temperature and flow control containing a portion of the soak water to which temperature controls are imparted, in correlation with desired processing requirements, a suitable pumping arrangement facilitates temperature-regulated water to be pumped in laminar flow through the charge of beans in the soak tank, and in continuous flow returned to the balance tank over a specified time period. This soak cycle is repeated under varied conditions, both as to temperature and time, in circulating the flow through the soak tank, until the intended amounts of solubles have been extracted from the beans, rendering the latter potentially more digestible to a consumer, while retaining the desired texture and taste of the legumes.

Figure 2:
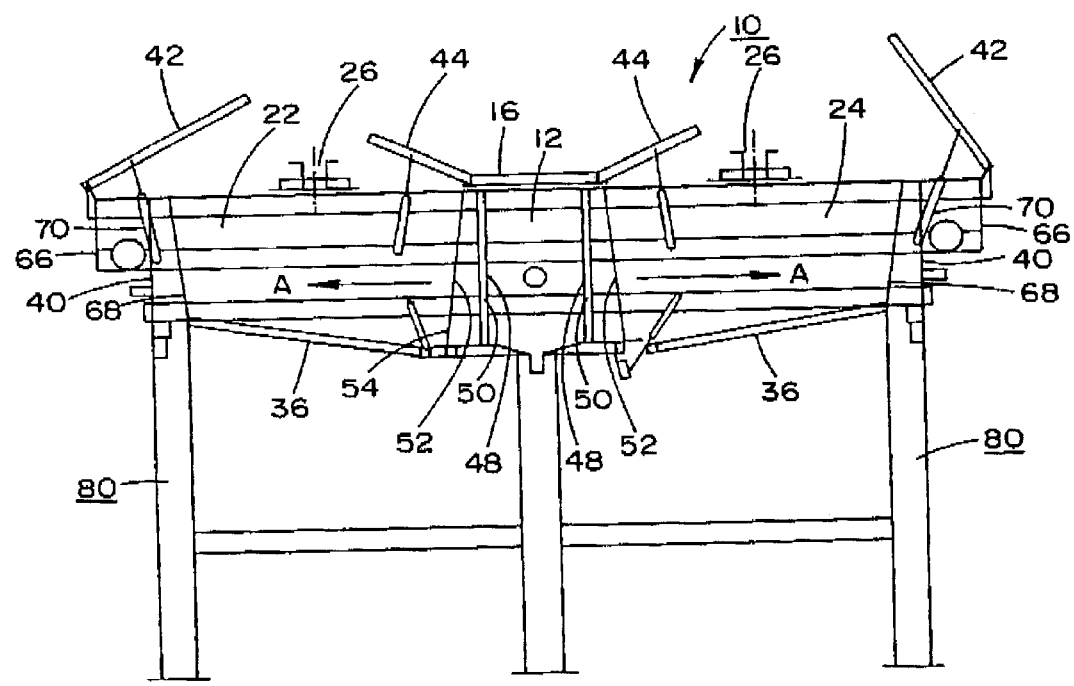
FIG. 2 illustrates a partially sectional front view of the soak tank of FIG. 1.

The apparatus is depicted schematically in FIGS. 1 and 2 and is described in more detail in the copending application referred to hereinabove. As illustrated therein, the apparatus contains a horizontal flow soak tank 10 which includes a header 12 of box-shaped configurations which possesses an inlet 14 for a soaking liquid, such as temperature-controlled water, and has a pressure holding cover 16 for maintaining a superatmospheric pressure in the header. Communicating with the opposite sides 18 and 20 of the header 12 and extending horizontally therefrom in mirror-image arrangement are a pair of hoppers 22, 24, each adapted to receive through inlets 26, a charge of legumes which are to be soaked in a continuous water flow and heated so as to extract solubles such as sugars in the form of oligosaccharides therefrom. The header 12 and hoppers 22, 24 communicate by means of a system of screens, wherein the soak tank 10 is in a continuous recirculating water flow connection with a balance tank 28 which provides a continuous flow of processing water under predetermined temperature and timing cycle conditions for effecting the treatment of the legumes.

Each hopper 22, 24 is of a generally rectangular configuration having vertically extending sidewalls 32, 34, and a bottom wall 36 which slopes at a generally upward incline away from the juncture thereof with the lower end of the header 12. As illustrated in FIG. 3A, extending along the bottom wall 36 of each hopper proximate the header lower end is a horizontal closable elongate outlet gate 38 for discharge of processed beans at the termination of the soak cycle. In a modified or second embodiment, as diagrammatically illustrated in FIG. 4, there is shown a vertically closable outlet or discharge gate 38A arrangement. The transverse end of each hopper distant from the header 12 communicates with an overflow trough 40 for reconveying the flow of water from the hoppers to the balance tank 28. The hoppers 22, 24 are each adapted to be sealed by closing covers 42 and 44.

Water is continuously introduced from the balance tank 28 into the header 12 under a superatmospheric pressure and a controlled temperature, and then passed through a system of screens communicating the header 12 with the hoppers 22, 24 so as to control the flow through the pile of beans contained in each of the hoppers of the horizontal flow soak tank. The water, after passing through the piles of beans in a generally horizontal laminar flow path is passed through dewatering screens into an overflow trough and then recirculated into to the balance tank 28, preferably by gravity flow, temperature and flow regulated in the balance tank, and again returned to the header for recirculation through the hoppers, thereby providing a continuous flow circuit.

The system of screens employed in the horizontal flow soak tank 10 provides a first set of screens between the header 12 and each respective hopper 22, 24, whereby a first vertical screen 48 converts turbulent flow of water in the header into non-laminar flow as the water passes through the screen 48. A further closely spaced screen 50, which may be parallel therewith, and wherein each screen possesses a small mesh will convert the non-laminar flow of the water into a transitional stage towards a somewhat more uniformly laminar flow as the water passes through the second screen 50. The flow then passes through a third screen 52, which may be a slotted bar screen, and functions as an end wall for each respective hopper 22 and 24, wherein flow through the screen 52 is a substantially laminar water flow extending uniformly horizontally across the width and cross-section of the tank containing the pile of beans extending towards the overflow trough. As a result of the foregoing, each bean in the pile of beans in the hopper 22 or 24 is soaked substantially uniformly to extract solubles therefrom, inasmuch as the flow of the circulating water is maintained at essentially constant levels within the hoppers of the soak tank 10.

The screen 52 is designed to separate the beans contained in the hopper from the jets of water emanating from the individual holes in the screen 50. This, in effect, enables the water jets to dissipate and become a uniform laminar plug flow during passage through screen 52. The latter is inclined relative to the vertical, so that the bottom end 54 thereof is extended forwardly to be closely adjacent the edge of the respective horizontal elongate gate 38 for discharging processed beans at the termination of the extraction of solubles. This inclined orientation of the screen 52, in conjunction with the upwardly sloping bottom wall 36 of each hopper will impart a slight upward circulation to the bottom pile of beans, ensuring a more uniform treatment thereof. This inclined orientation of the screen 52 provides a relief angle for the expansion of the bean pile as the beans rehydrate and expand in the respective hoppers. In addition, the use and location of screen 52 separates the pile of beans from the negative impact of direct impingement of the soak water media exiting from the screens 48 and 50.

In the alternative embodiment, as illustrated FIG. 3, a vertically closable elongate bar screen is employed to discharge beans. Pursuant to this embodiment, movable screen 52A operates as part of upwardly angled screen 52 during processing so as to provide a relief angle during this processing of the beans. During bean discharge, screen 52A is vertically actuated to allow beans from hoppers 22 and 24 to enter the discharge area 38A.

The surface 56 of the screen 52 facing the interior of the respective hopper 22, 24, so as to form the so called slotted bar screen, is provided with closely spaced vertically extending raised ribs 58 having smooth surfaces 60 along which the beans can gently slide upwardly during circulation as the beans swell. The openings or apertures 62 in the screen 52 are located intermediate the ribs to facilitate the flow of water therethrough, while the ribs hold the beans in spaced relationship from the apertures 62 so as to prevent clogging of the latter. In essence, the pile of beans which is being soaked and processed is angled upwardly at the bottom thereof so as to cause the beans to gently lift up and thus prevent damage to the lower layers of the beans.

At the discharge end 66 of each hopper 22 or 24 there is located a screen 68 which is similar in construction to screen 52, such as a slotted bar screen, but which is inclined at a reverse angle relative thereto, so as to form a bean holding structure for the hopper, and also provides a relief angle for the bean pile as swelling takes place. A solid baffle 70 arranged interiorly of screen 68 imparts an under-overflow to the water exiting from the soak tank as it is recirculated to the balance tank 28.

In essence, the entire horizontal flow soak tank 10 may be supported on suitable support structure 80.

Located at regions within the hoppers 22, 24 containing the beans which are to be processed are a plurality of temperature sensors as probes 84 which will constantly monitor the temperature of the process water so as to enable controllers to compensate for temperature deviations in the water of the balance tank 28 which is being recirculated into the soak tank 10 and to thereby accurately regulate the processing cycle.

The operation of the soak tank system is essentially as follows:

The empty clean hoppers 22, 24 are initially filled with clean water at ambient temperature. This water may be a mix of hard and soft water, as described hereinabove.

The optionally pre-conditioned legumes are then added to the tank, wherein the amount of legumes added will vary, based on the swelling characteristics of a particular genus.

In the balance tank 28, the water is heated to the first temperature and recirculated through the legume pile in horizontal plug flow in the first step of the process to permit partial rehydration of the legume, in accordance with Step 1 described hereinabove. The water may then be heated optionally to the transition temperature.

The water is then heated to the second temperature, as described hereinabove.

Thereafter, the water is heated to a third temperature to permit diffusion of the sugar and other solubles from the legumes into the soak water and to permit the natural oligosaccharide-reducing enzyme to hydrolyze the flatulence causing sugars as described hereinabove. If the legumes are blanched, they may be blanched in a blancher. Alternatively, they may be blanched in the water bath. If blanched in the water bath, then the soak water is heated to blanching temperatures.

As described hereinabove, when the old soak water has a high brix, fresh soft water is bled into the recirculating water. A different number of bleed-in levels would be acceptable, wherein a preferred rate of bleed-in of fresh water is about 1.0%/min to about 4.0%/min; in essence, in a preferred embodiment fresh water is added at a volume of 2.6% of the free water in balance tank 28 plus the soak tanks 22 and 24.

The recirculating water system employed incorporates water temperature controls (not shown) using well known process control techniques. The water is recirculated by means of the balance tank 28 at a rate sufficient to cause the flow rate through the plurality of perforations in the screens to become non-laminar; but with the flow of the water through each hopper being laminar in nature.

Pursuant to a further preferred embodiment, there is provided an additional relatively large-apertured screen upstream of the small-hole screens/perforated plates or within the overflow troughs. This screen merely removes large particles, such as bean skins and other debris, which can enter the recirculating system. Accordingly, that screen acts like a prior art physical removing filter.

The water flow through the final slotted bar wire screen 52 is substantially equal in its distribution and very slow across the entire screen surface, possibly about 1 cm per second, whereas at this laminar water flow velocity the beans offer very little resistance and the flow stays substantially equal around and through the bean pile with the water eventually reaching the discharge end of the bean pile at the outermost screen at substantially the same velocity and temperature, adjusted for the change in surface area of screen 68 caused by upwardly angled wall 36.

The balance tank 28 is level-controlled, using well known control technology and discharges into a recirculating pump wherein a series of communicating valves permit bleed-out of old water, while a level controller bleeds in fresh water. A bleed-out system from the discharge side of the tank permits old water to be discharged while the level controller concurrently adds fresh water.

Figure 7:
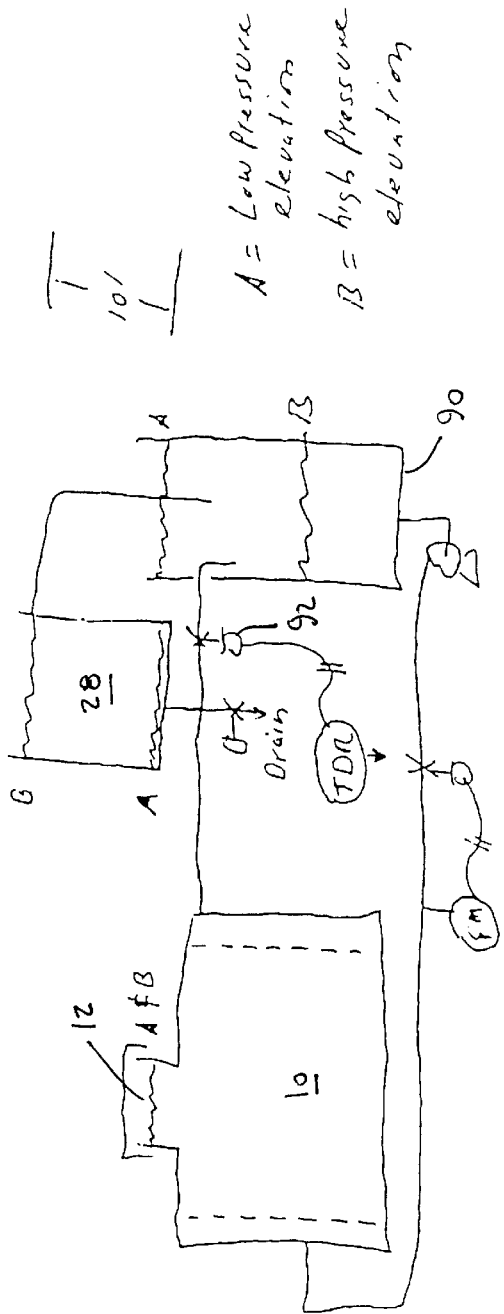
FIG. 7 illustrates a diagrammatic representation of a modified horizontal flow soak tank system.
Figure 8:
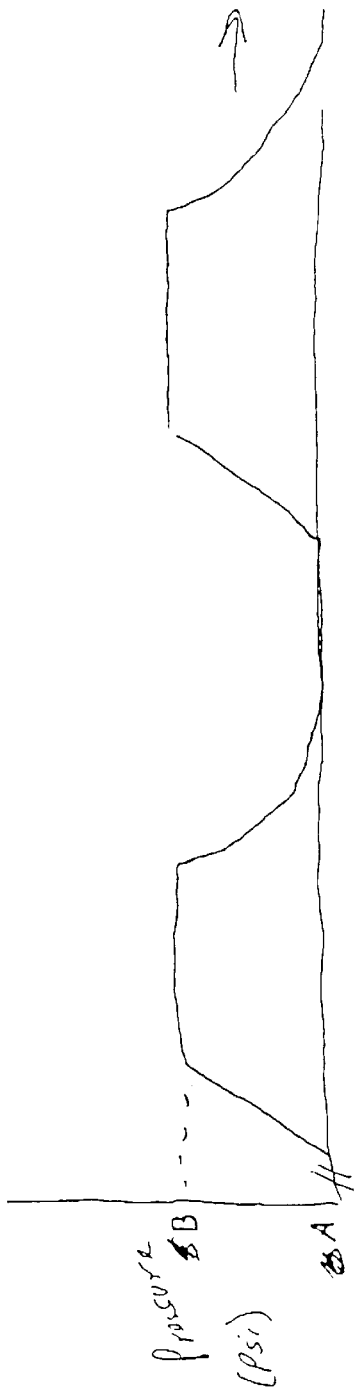
FIG. 8 illustrates a graph of pressure over time profile for the modified system of FIG. 7.

FIG. 7 of the drawings represents another embodiment of the apparatus in which components similar to or identical with these described in connection with FIGS. 1 to 6 are identified by the same reference numerals. Inasmuch as any absolute change in pressure in the processing cycle is small, since excessively large pressure changes can rupture the beans, normal non-pressurized vessels or tanks 10 can be employed.

Consequently, the system can be modified by the addition of a hydrostatic catch tank 90 at the discharge of the soak tank 10, with a timer-activated by-pass valve 92. Thus, when the by-pass valve 92 is closed, water is forced to flow into the balance tank, and overflow from the balance tank 28 to discharge into catch tank 90.

This process gradually fills the balance tank 28, and correspondingly gradually increases the hydrostatic head in the soak tank 10.

When the by-pass valve 92 is opened in a logical sequence, the balance tank 28 drains into the catch tank 90, lowering the soak tank pressure down to atmospheric pressure. The size of the balance tank 28 divided by the recirculation rate (volume/volume per time time) controls the time of transition from high pressure to low pressure and back again.

Unless indicated to the contrary, the percentages used herein are by weight.

Unless indicated to the contrary, when referring to temperatures in the process, it is understood that reference is made to the temperature in Fahrenheit of the soak water in which the legumes are immersed.

Unless indicated to the contrary, the temperatures indicated herein with respect to the process steps, are those of the soak water.

The following examples further illustrate, but do not limit, the present invention.

Furthermore, in reviewing the following examples, it is to be understood that the free water in the soak tank is computed as the total volume of the soak tank apparatus minus the legume volume. Since water has a density of 1 g/mL the free water can also be calculated by weighing the container filled with water and the desired amount of legumes and subtracting out the weight of the container without water when the desired amount of legumes are present therein. The volume of legumes is measured experimentally.

For example, with navy beans, a small container is filled with soaked beans and weighed. The container is then filled to the brim with water and weighed a second time. The container is emptied and filled with water and weighed, for example, a 16 oz can for navy beans hold 448 ml of water. A 16 oz. can filled with only navy beans in the absence of sauce typically weighs 298 g. The volume of bean and water used typically weighs 482 g. The free water in the can is (482−298) 184 g. The free water percent in the can is (184×100)/448=41%.

The free water in the apparatus used in some of the examples described hereinbelow is calculated the same way.

For example, in an embodiment of the apparatus, the balance tank volume is 149 gallons and the soak tank volume is 206 gallons. Together the volume is 355 gallons. A typical free moisture is therefore 0.41×(206)+149=233 gallons.

Variation in bean swelling causes variations in the free moisture calculation.

In the following examples, % oligosaccharide in the legume and % starch gelation were determined using the following techniques.

(a) % Oligosaccharides

This was determined in accordance with Procedure AOAC 977.20, incorporated herein by reference, utilizing a standard liquid chromatograph having a column 300×4 (id) mm $\mu$ Bondapak/Carbohydrate. The flow rate was 1.0 ml/min and the temperature setting is at ambient temperature.

The reagents used for the mobile phase is acetonitrile diluted with water ranging from 60 parts acetonitrile/40 parts water (v/v) to 90 parts acetonitrile/10 parts water (v/v), with 70:30 acetonitrile/water being the optimum (v/v).

The standards used were fructose, glucose, raffinose, stachyose, and verbascose. One gram of each of the sugars was dissolved separately in 100 mL of water, then 4 parts of the aqueous solution was diluted with 6 parts (v/v) of acetonitrile. 20 $\mu$L of each of these solutions were injected into the liquid chromatograph to obtain the retention times.

In preparing the bean sample, about 15 g of product is weighed into a shaker cup, 100 mL of water were added thereto, and sample was shaken for at least 30 minutes to assure dissolution of sugar. Liquid samples from the beans were used as is. 4 parts of aqueous solution was diluted with 6 parts (v/v) of acetonitrile, allowed to sit for at least two minutes to assure precipitation of insolubles, then filtered and injected into the liquid chromatograph.

20 $\mu$L of sample is injected and the % of oligosaccharide present is determined by integrator values or from peak heights as follows:

$$\text{weight \% sugar} = 100 \times PH/PH^1 \times (V/V^1) \times (W^1/W)$$

where PH and $PH^1$=peak heights (or integrator values) of sample and standard, respectively; V and $V^1$=mL sample and standard solutions; and W and $W^1$=g sample of standard, respectively.

(b) Gelation

Gelatinization is reported as the percent of total starch that is enzymatically available due to heat, mechanical or chemical damage of the starch granule under conditions of the test.

Total starch is determined by AACC method 76-11, AOAC method 979.10 and AOAC method 999.16, the contents of all of which are incorporated by reference.

The reagents used in the test are:
1. 80% ethanol. Add 800 mL ethanol to a 1 liter flask, add 200 mL DI water, and mix well.
2. Phosphate buffer pH 6.0.

Add 7.7 grams sodium phosphate dibasic and 35.0 grams sodium phosphate monobasic to 2 liters of distilled water. Mix to dissolve and dilute to 4 liters. Adjust pH to 6.0 with concentrated phosphoric acid.

3. Phosphate buffer 4.3 pH. Add 43 grams sodium phosphate monobasic to 4 liters of distilled water—mix to dissolved and adjust to pH 4.3 with acid.
4. GOP—Glucose oxidase—peroxidase.

Mix together portions of the following solutions separately.

a. Solution A
1. sodium phosphate dibasic anhydrous—4.601 grams
2. sodium phosphate monobasic monohydrate—1.056 grams
3. Benzoic acid ($C_7H_6O_2$)—4.000 grams
4. 4-Hydroxybenzoic acid ($C_7H_6O_3$)—3.000 grams Dissolve these chemicals in 1800 mL water in a 2 liter volumetric flask by stirring several hours at room temperature. Dilute to mark and mix well. Adjust pH to 7.4 with 6 M NaOH. Solution is stored at 4° C., and is stable for at least 12 months.

b. Solution B

In a screw-cap test tube, weigh enough glucose oxidase so that 25,000 units are obtained. Tare the test and weigh in 2.0 grams of finely ground ammonium sulfate to stabilize the enzyme. Mix the enzyme and ammonium sulfate thoroughly before the addition of water. Pipet 2 mL water and mix into a thick slurry. Pipet 2 more mL of water and mix again. Store at 4° C.

c. Solution C

Weigh exactly 10,000 Units Sigma P-8250 peroxidase into a paper cup or beaker. (Approximately 0.6 grams)

d. Solution D

Add 15 mL water to 0.3 grams of 4-aminophenazone (i.e., 4-aminoantipyrine). This solution must be made fresh just before preparation of the working solution and any extra is discarded after use.

e. Working Solution

To a liter amber volumetric flask, add the following:
1. Solution A, 500 mL
2. Solution B, 1.0 mL—(Glucose oxidase)
3. Solution C, 1.0 mL—(Peroxidase 10,000 units)
4. Solution D, 5.0 mL (4-AAP)
5. Solution A, 500 mL This GOP is stable for three months when stored in the dark at 4° C.

The % of gelatinization in the legumes is tested on the final bean product after retorting in which the vehicle has been added to the legume. Prior to measuring the % gelation, the legume is separated from the sauce by filtering (straining into a strainer) and washing the collected legumes.

If sugars have been added to the legumes during the processing, then the sample is desugared by grinding a weighed sample (if Bean wet, the amount is 1.5 g, if Bean in sauce the amount is 5.0 g), and mixing with boiling water (7 ml if wet Bean, 4 ml if Bean in sauce), removing precipitate, and extracting the sugars with denaturing ethyl alcohol (35 mL) and centrifuging the samples at ¾ speed in a centrifuge, e.g., IEC HN SII for 5 min., decanting off and discarding the alcohol.

PROCEDURE FOR TOTAL AND GELATINIZABLE STARCH
Weight Table

| | |
|---|---|
| Bean, wet (no syrup) | 1.5 g |
| Bean, dry | 1.0 g |
| Flour, wheat | 0.5 g |
| Glucose (standard) | 0, 0.1, 0.2, 0.3, 0.4, 0.5 grams |
| Wheat starch (standard) | 0, 0.1, 0.2, 0.3, 0.4, 0.5 grams |

Procedure

1. The appropriate amount of ground sample is weighed into a flask. 5 standards are used using wheat starch for total starch, and glucose for gelatinizable starch.
2. 50 mL of the appropriate buffer, are added thereto, (pH 4.3 for determining gelatinizable starch and pH 6.0 for total starch.)
3. TOTAL STARCH—AUTOCLAVE (Skip the next step for determining gelatinizable starch)
4. 0.2 mL of heat stable amylase is added to the ground sample and mixed, and autoclaved, for 60 minutes at 121 psi. Cool to touch, add a magnetic stir bar, and adjust pH to 4.5±0.2 with 1N HCl.
5. 0.2 mL amyloglucosidase is added to the flask.
6. The samples are incubated with stirring for 120 minutes. Cool overnight.
7. The contents are transferred to a labeled 500 mL volumetric flask. Dilute to volume and invert 10 times.
8. A portion of the liquid is removed and place in a 1.5 mL labeled mini centrifuge tube. Centrifuge for 5 minutes.
9. A 100 µL portion is pipeted into each of two 13×100 mm tubes. Add 3.0 mL glucose oxidase/peroxidase reagent to each tube. Incubate for 30 minutes at 50° C. Remove and cool for at least 30 minutes. The absorbance is measured at 510 nm.

Establish a starch curve by plotting the absorbance at 510 nm versus weight of standard.

$$\text{Total starch} = \frac{\text{(Starch from curve)}}{\text{Sample weight}} \times 100$$

$$\text{Gelatinizable starch} = \frac{\text{(Glucose from Curve)}}{\text{Sample weight}} \times .9 \times 100$$

EXAMPLE 1

Dry navy beans having a moisture content of about 8% to 16% are placed in a horizontal soak tank as described hereinabove containing 355 gallons of water. Water in the tank is recirculated at a rate of 90 gallons per minute. The legumes are soaked at 80° F. for about 4 minutes. The soak water is changed and the beans are maintained at 80° F. for an additional 10 minutes, at which time the temperature of the soak water is increased to 115° F. Once the water bath attains that temperature, the beans are soaked at that temperature for another 15 minutes. The temperature of the water bath is raised to 129° F. and the beans are soaked at that temperature for 39 minutes. The temperature of the soak water is raised to 145° F., and the beans are soaked at that temperature for nine minutes. The soak water is heated to 157° F., wherein the beans are maintained at that temperature for 48 minutes; then the temperature of the soak water is reduced to 147° F., wherein the beans are soaked at that temperature for 132 minutes. The water is changed twice during this soaking, once after 24 minutes, another time after 93 minute of soaking. The water is bled off at a rate of about 7% and added at about a rate of 7% (at a rate of 3.6 gallons per minute) once the temperature is reduced to 147° F. After this step, the legumes are placed in a can and baked bean sauce is added thereto, and the mixture is retorted.

Comparative Example 1

Leading brands of commercial navy Baked Beans were fed to a panel of adult men and woman. The panelists who have fasted from 11:00 pm the previous night, ate the beans at 8:30 am, and ate no other solid food, and took no liquid beverage except coffee, water, or tea until 4:30 pm. The panelists recorded all incidences of flatulence during the 8 hour evaluation period.

| Product | Number of Panelists | Average Number of Flatus incidences over 8 hour evaluation period |
|---|---|---|
| Brand 1 | 57 | 13.0 |
| Brand 1 (repeated) | 53 | 13.0 |
| Brand 2 | 51 | 13.0 |
| Brand 1 with commercial Alpha-galactoses Food Enzyme added | 41 | 12.0 |

EXAMPLE 2

700 pounds of dry navy beans were soaked in 355 gallons of a mix of hard and soft water, to achieve a starting hardness of 68 ppm calcium carbonate. The water was recirculated at 90 gallons per minute. Free moisture in the system was 268 gallons at the end of the experiment. The dry beans were soaked for 12 minutes at 80° F., then the temperature was raised to 124° F. for 20 minutes (time after achieving said temperature), then raised to 128° F. for 15 minutes. The temperature was increased to 157° F. for 48 minutes. Fresh soft water was bled into the tank at 7 gpm for 132 minutes. As the bleed-in began, the temperature was lowered to 149° F. for 24 minutes, then 145° F. for 93 minutes and then 135° F. for 15 minutes. The bleed-in was terminated and the water in the tank replaced with fresh, soft water. Sufficient salt was added to bring the salt-in-water concentration to 2% for 6 minutes. The beans were drained, canned and normal baked bean sauce was added. The beans were retorted in steel cans. The cooked beans and sauce had 0.025% residual oligosaccharides, a starch gelation of 83.2% and a six member panel averaged 2.2 flatus releases in an 8 hour period. The bean skins were judged too tough by a skilled sensory panel. Cracks were 12.5%.

EXAMPLE 3

700 pounds of dry navy beans were added to 355 gallons of soft and hard water to make a 34 ppm calcium carbonate blend. Beans were soaked for 12 minutes at 80° F. The temperature was increased to 124° F. for 20 minutes, then increased again to 128° F. for 39 minutes, then increased again to 157° F. for 48 minutes. Fresh, soft water was bled in at 3.5 gpm for 132 minutes. As soon as the bleed-in began, the temperature was lowered to 149° F. for 24 minutes, then lowered to 145° F. for 93 minutes, then lower to 135° F. for 15 minutes. Bleed-in was terminated and the soak water was replaced with fresh soft water. The soaked beans were then soaked in a 2% hexametaphosphate solution for 4 minutes, then drained. Baked bean sauce was added and the sealed cans were retorted for 85 minutes at 252° F. The cooked beans and sauce had 0.046% residual oligosaccharides, 88.3% starch gelation and a six member panel averaged 5.4 flatus releases in an 8 hour period. Skin texture was a commercial match to comparable production beans. Cracks were 10%.

EXAMPLE 4

700 pounds of dry navy beans were soaked in 355 gallons of 68 ppm hard water for 6 minutes at 80° F. Water was recirculated at 90 gpm. The temperature was raised to 122° F. for 15 minutes. Fresh soft water was bled in for 165 minutes at 7 gpm. As soon as the bleed-in began, the temperature was raised to 150° F. for 30 minutes. The temperature was lowered to 147° F. for the remainder of the bleed-in period. The water was changed with fresh soft water and allowed to soak for a final 30 minutes at 147° F. The beans were drained and soaked in 1% hexametaphosphate solution for 4 minutes at 135° F. The beans were drained, canned in baked bean sauce and retorted normally.

EXAMPLE 5

700 pounds of navy beans were soaked in 355 gallons of water with a natural hardness of 68.4 ppm calcium carbonate at 80° F. for 12 minutes. The temperature was raised to 122° F. for 15 minutes, then raised again to 157° F. for 30 minutes. Water was recirculated at 90 gpm continuously. After the 157° F. soak, fresh, soft water was bled into the soak tank at 7 gpm for a total of 152 minutes. After the onset of the bleed-in rate was increased to 90 gpm for 8 minutes in the soak tank, effectively changing the soak water. The beans were soaked an additional 30 minutes at 147° F. All temperatures represents a mean value. The beans were drained and rinsed in a 1% hexametaphosphate solution for 4 minutes, then canned in baked bean sauce.

There were 700 beans in a full 16 oz can. Cracked beans were 12.4%. Otherwise, the beans were an organoleptic match to commercial beans.

EXAMPLE 6

This demonstrates the importance of low residual oligosaccharides on flatus gas release. Six panelists were fed 16 ounces of baked beans prepared in accordance with the present invention with the following composition and flatus results.

| Total oligosaccharides (%) | % starch gelation | Flatus releases per 8 hour |
|---|---|---|
| .059 | 82.0 | 4.0 |
| .000 | 82.1% | 2.8 |
| .025 | 83.2 | 2.2 |

EXAMPLE 7

This demonstrates the importance of starch gelation on flatus gas release. Six panelists were fed 16 ounces of baked beans prepared in accordance with the present invention with the following composition and flatus results.

| Total oligosaccharides | % starch gelation | Flatus releases per 8 hour |
|---|---|---|
| .046 | 88.3 | 5.4 |
| .056 | 77.6 | 7.9 |

EXAMPLE 8

700 pounds of dry navy beans were soaked in 355 gallons of a mix of hard and soft water, to achieve a starting hardness of 68 ppm calcium carbonate. The dry beans were soaked for 12 minutes at 80° F., then the temperature was raised to 124° F. for 20 minutes (time after achieving said temperature), then raised to 128° F. for 15 minutes. The temperature was increased to 157° F. for 48 minutes. Fresh soft water was bled into the tank at 7 gallons per minute for 132 minutes. As the bleed-in began, the temperature was lowered to 149° F. for 24 minutes, then 145° F. for 93 minutes and then 135° F. for 15 minutes. The bleed-in was terminated and the water in the tank replaced with fresh, soft water. Sufficient salt was added to bring the salt-in-water concentration to 2% for 6 minutes. The beans were drained, canned and normal baked bean sauce was added. The beans were retorted in steel cans. The cooked beans and sauce had 0.025% residual oligosaccharides, a starch gelation of 83.2% and a six member panel averaged 2.2 flatus releases in an 8 hour period. Cracks were 12.5%.

EXAMPLE 9

700 pounds of dry navy beans were added to 355 gallons of soft and hard water to make a 34 ppm calcium carbonate blend. Beans were soaked for 12 minutes at 80° F. The temperature was increased to 124° F. for 20 minutes, then increased again to 128° F. for 39 minutes, then increased again to 157° F. for 48 minutes. Fresh, soft water was bled in at 3.5 gpm for 132 minutes. As soon as the bleed-in began, the temperature was lowered to 149° F. for 24 minutes, then lowered to 145° F. for 93 minutes, then lowered to 135° F. for 15 minutes. Bleed-in was terminated and the soak water was replaced with fresh soft water. The soaked beans were then soaked in a 2% hexametaphosphate solution for 4 minutes, then drained. Baked bean sauce was added and the sealed cans were retorted for 85 minutes at 252° F. The cooked beans and sauce had 0.046% residual oligosaccharides, 88.3% starch gelation and a six member panel averaged 5.4 flatus releases in an 8 hour period. Skin texture was a commercial match to comparable production beans. Cracks were 10%.

EXAMPLE 10

700 pounds of beans were soaked as in Example 9, except the initial calcium level was 68 ppm and the time below 130° F. was 60 minutes. After 60 minutes of rehydration, the temperature was increased to 146° F. for 24 minutes. The bleed rate was 7 gallons per minute, but the rest of the soak was as in Example 9. The residual oligosaccharides were 0.037%, the starch gelation was 84.1% and the panel had 4.3 flatus releases. Skin texture was a commercial match, but cracks increased to 15.1%.

EXAMPLE 11

700 pounds of dry navy beans were soaked in 355 gallons of 68 ppm hard water for 6 minutes at 80° F. Water was recirculated at 90 gpm. The temperature was raised to 122° F. for 15 minutes. Fresh soft water was bled in for 165 minutes at 7 gpm. As soon as the bleed-in began, the temperature was raised to 150° F. for 30 minutes. The temperature was lowered to 147° F. for the remainder of the bleed-in period. The water was changed with fresh soft water and allowed to soak for a final 30 minutes at 147° F. The beans were drained and soaked in 1% hexametaphosphate solution for 4 minutes at 135% F. The beans were drained, canned in baked bean sauce and retorted normally.

EXAMPLE 12

700 pounds of navy beans were soaked in 355 gallons of water with a natural hardness of 68.4 ppm calcium carbonate at 80° F. for 12 minutes. The temperature was raised to 122° F. for 15 minutes, then raised again to 157° F. for 30 minutes. Water was recirculated at 90 gallons per minute continuously. After the 157° F. soak, fresh, soft water was bled into the soak tank at 7 gallons per minute for a total of 152 minutes. After the onset of the bleed-in, the temperature was reduced to 147° F. for the remainder of the bleed-in period. The water bleed-in rate was increased to 90 gallons per minute for 6 minutes in the soak tank, effectively changing the soak water. The beans were soaked an additional 30 minutes at 147° F. All temperatures represent a mean value. The beans were drained and rinsed in a 1% hexametaphosphate solution for 4 minutes, then canned in baked bean sauce.

There were 700 beans in a full 16 oz can. Cracked beans were 12.4%. Otherwise, the beans were an organoleptic match to commercial beans.

EXAMPLE 13

Beans were soaked as in Example 12, except that the initial soaking after the onset of bleed-in was 147° F. for 30 minutes, followed by 30 minutes at 157° F., with the remainder of the bleed-in at 147° F. Said another way, the 30 minute 157° F. soak and the initial 30 minutes of the 147° F. soak of Example 12 was reversed.

There were 718 beans in a full 16 oz. can, a 1.8% yield loss compared to Example 12. Cracked beans were 15.5%, a 25% increase in cracking. Otherwise the beans were an organoleptic match to commercial beans.

EXAMPLE 14

400 g of navy beans were added to 1600 ml of 68 ppm hardness water for 12 minutes at 78° F. The water was changed and the beans were held at 122° F. for 15 minutes. The water was changed again and held again for 15 minutes at 144° F. The water was changed again and held at 149° F. for 10 minutes. The water was changed again and held at 154° F. for 10 minutes. The water was changed again and held for 10 minutes at 158° F. Finally, the water was changed again (with 1% hexametaphosphate added) for 4 minutes at 134° F. The beans were drained and canned in baked bean sauce.

The water changing was done to accelerate heat transfer in a non flowing system.

The experiment was repeated with the elimination of the 122° F./15 minute step. The results are tabulated.

| Experiment | % oligosaccharides in the can (average of beans and sauce) | Bean Starch gelation |
|---|---|---|
| With 122° F./15 minute step | .163% (a 42% reduction) | 83.3% |
| Without 122° F./15 minute step | .293% | 78.5% |

EXAMPLE 15

700 pounds of dry navy beans were soaked in 355 gallons of 80° F. water (68.4 ppm calcium carbonate) for 12 minutes. The temperature was raised to 114° F. for 15 minutes, then to 127° F. for 15 minutes, then 157° F. for 45 minutes. Fresh soft water was bled in at a rate of 7 gpm for 135 minutes. Water was continuously recirculated at 90 gpm. The soak temperature during the bleed-in was maintained at 147° F. At the end of said 135 minutes, the soak water was drained and replaced with fresh, soft water and soaked for an additional 30 minutes at 147° F. The beans were drained and rinsed for 4 minutes with hexametaphosphate solution with various concentrations of phosphate as shown in the table. The beans were drained, canned and cooked in baked bean sauce. The navy bean texture was measured with a texturometer. The target texture using a shear press texturometer is 6700. The beans were also analyzed by a sensory panel for meat texture, skin texture and the meld between same. The target for the average of the three sensory measures is 5.0, lower numbers are tougher, higher numbers are softer. 1% phosphate is preferred.

| Hexametaphosphate concentration (%) | Texturometer reading target = 6700 | Average score of meat texture, skin texture and skin/meat meld. Target = 5.0 |
|---|---|---|
| .5 | 7058 | 4.3 |
| 1 | 7108 | 5.2 |
| 1.5 | 6324 | 5.3 |
| 2 | 6068 | 5.3 |

EXAMPLE 16

400 grams of ambient temperature kidney and pinto beans were added to warm water (34 ppm calcium carbonate) and placed in a constant temperature bath containing 1600 mL of water. The bean-free water was heated to that temperature such that the combination of beans and water equaled the temperature setting of said constant temperature bath.

The beans were weighed after 30 minutes as per the table.

| Bath Temperature (° F.) | Weight of 400 g pinto beans after 30 minutes of soaking & % increase (g) | Weight of 400 g kidney beans after 30 minutes of soaking & % increase (g) |
| --- | --- | --- |
| 128 | 571 . . . 43% | 446 . . . 12% |
| 130 | 563 . . . 41% | 454 . . . 14% |
| 132 | 565 . . . 41% | 471 . . . 18% |
| 148 | 590 . . . 48% | 492 . . . 23% |
| 149 | 645 . . . 61% | 526 . . . 32% |
| 151 | 667 . . . 67% | 611 . . . 53% |

EXAMPLE 17

Navy beans were prepared in accordance with the present invention except that the concentration of the phosphate rinse was varied as per the table. The level of phosphate affected the residual oligosaccharide.

| Phosphate Concentration | Bean Oligosaccharide |
| --- | --- |
| 0.5 | .026 |
| 1.0 | .025 |
| 1.5 | .009 |
| 2.0 | .000 |

EXAMPLE 18

The procedure of Example 12 is repeated, except after the initial soaking at 80° F., the temperature of the soak water is raised to 115° F. for 65 minutes. The temperature is raised to 147° F. for about 50 minutes, 149° F. for 23 minutes and 145° for 35 minutes. After the 145° F. soak, fresh, soft water was bled into the soak tank. The remainder of the procedure of Example 12 is repeated except that the phosphate rinse is performed with a 2% hexametaphosphate solution at 135° F.

EXAMPLE 19

The procedure of Example 14 was repeated, except black eye beans were used instead of navy beans.

EXAMPLE 20

700 pounds of pinto beans were soaked in 355 gallon soft water at 115° F. and soaked for 30 minutes. Phosphate was added per the table.

| Phosphate Added | Initial Moisture | 30 Minute Moisture |
| --- | --- | --- |
| 1% at time = zero | 12.3% | 27.2% |
| 1% at time = 6 min. | 13.4% | 50.0% |

EXAMPLE 21

2800 pounds of navy beans were preconditioned (i.e., cleaned) for 8 minutes in soft water at 80° F.

Simultaneously, a soak tank was filled with 1424 gallons of water with 68-PPM calcium at 115° F. flowing at 360 gallons/minute. (This flow rate continued throughout the process). The beans soaked at 115° F. for 59 minutes.

The temperature of the water was then raised to 147° F. and the beans soaked for another 48 minutes. At that point, water in the soak tank was bled off at 20 gal. every 43 seconds and simultaneously replaced with fresh soft 149° F. water. The beans soaked for an additional 24 minutes at 149° F. as the bled-off and fresh water replacement continued.

The temperature was then lowered to 145° F. and the beans soaked for 33 minutes, after which the bleed ended. The water in the tank was then totally drained out and simultaneously replaced at 360 gal./minute for 6 minutes with fresh, soft, 147° F. water. The beans soaked for 60 minutes at 145° F., at which point the water was once again totally drained out and simultaneously replaced at 360 gal./minute for 6 minutes with fresh, soft 147° F. water. The beans then soaked an additional 30 minutes at 145° F.

The beans were then soaked for 16 minutes in 125° F. fresh water containing 2% hexametaphosphate. Following this, the beans underwent a 14 minute soak in fresh soft 125° F. water.

The beans were then pumped from the tank to a filler, mixed with a vehicle, put into cans and retorted.

EXAMPLE 22

700 pounds of dry pinto beans were added to 355 gallons of 115° F. soft water in the apparatus described above. The beans were soaked for 30 minutes at 115° F. The temperature was increased to 137° F. for 105 minutes total elapsed time (75 minutes at 137° F.). The temperature was raised to 145° F. for a total elapsed time of 360 minutes (240 minutes at 145° F.).

Meanwhile, fresh soft water was bled in at a constant rate of 2.8 gallons per minute from 30 minutes elapsed to 195 elapsed minutes. Then the water was drained and replaced twice with fresh, soft water at 145° F. and soaked as described above. The drain and replace steps were executed as a bleed in at 90 gallons per minute for 4 minutes. After the first water change, the beans were soaked for 90 minutes. After the second water change, metaphosphate was added at 0.5% and the beans were soaked for 60 minutes also at 145° F.

The beans were canned in brine sauce and retorted. The oligosaccharides were reduced by 97.5%; there were 2.2 grams of total unavailable starch in the beans and sauce (i.e. starch that was not gelled and is not digestible); 85.3% of all the starch was gelled. The beans were a commercial match organoleptically, to ordinary brine-cooked pinto beans. Cracking was 7.5%.

EXAMPLE 23

Example 22 was repeated, except the temperature of the soak water was raised to 149° F. for 15 minutes at the end of the 137° F. step.

The oligosaccharides were reduced 97.1%; there were 1.7 g of total unavailable starch (a 21% reduction); 87.9% of all the starch was gelled. The beans were a commercial organoleptic match. Cracking was 11.8%.

The above preferred embodiments and examples are given to illustrate the scope and spirit of the present invention. These embodiments and examples will make apparent to those skilled in the art other embodiments and examples. These other embodiments and examples are within the contemplation of the present invention.

Therefore, the present invention should be limited only by the appended claims.

What is claimed is:

1. A process for reducing flatulence caused by ingestion of a legume comprising:
   (a) soaking a legume in a water bath having stagnant, sprayed or flowing water at a first temperature which is above ambient temperatures but less than the critical rehydration temperature under conditions effective to rehydrate the legume to at least about 50% of that of a fully hydrated legume;
   (b) heating the rehydrated legume in a water bath at a second temperature under conditions effective to increase the moisture content thereof to an amount which is greater than that of full hydration, said second temperature being greater than the first temperature and the critical rehydration temperature, and less than the maximum starch gelation temperature, and being at about or above the endogenous oligosaccharide reducing enzyme inactivation temperature; and
   (c) soaking and heating the rehydrated legume of step (b) in a water bath at a third temperature at a pH ranging from about 5.5 to about 9.0 under conditions effective to substantially remove all of the flatulence-causing oligosaccharide from the legume, said third temperature being greater than the critical rehydration temperature and the first temperature but less than the second temperature and the endogenous oligosaccharide reducing enzyme inactivation temperature.

2. The process according to claim 1 in which the second temperature of the soak water is at about the endogenous oligosaccharide reducing enzyme inactivation temperature.

3. The process according to claim 2 in which the second temperature of the soak water is within about 5° F. of the endogenous oligosaccharide reducing enzyme inactivation temperature.

4. The process according to claim 1 in which the second temperature is greater than the endogenous oligosaccharide reducing enzyme inactivation temperature.

5. The process according to claim 1 which additionally comprises (d) blanching the legume product of step (c).

6. The process according to claim 1 wherein the legume is a navy bean, pinto bean, kidney bean, great northern bean, large or small white bean, pink bean, calico bean, cranberry bean, black bean, red bean, lentil, lima bean, purple hull bean, garbanzo bean, field pea, black-eye pea, chick pea, soybean or combination thereof.

7. The process according to claim 1 wherein the water bath is substantially adiabatic.

8. The process according to claim 1 wherein the initial water source in step (a) has a calcium concentration ranging from about 0 ppm to about 120 ppm.

9. The process according to claim 1 wherein the legumes are stored prior to the soaking step (a) at a temperature of about 35° F. to about 50° F. until the legumes reach a equilibrium temperature.

10. The process according to claim 1 wherein step (a) is conducted at a temperature ranging from about 80° F. to about 130° F.

11. The process according to claim 10 wherein step (a) is conducted at a temperature ranging from about 90° F. to about 130° F.

12. The process according to claim 1 wherein the moisture content of the legume at the end of step (a) ranges from about 85% to about 97% of a fully hydrated legume.

13. The process according to claim 1 wherein the second temperature of the water bath ranges from about 135° F. to about 155° F.

14. The process according to claim 1 which additionally comprises heating the product of step (a) at a temperature between the first and second temperature prior to step (b).

15. The process according to claim 1 wherein the moisture content of the legume produced in step (b) ranges from about 54% to about 65% by weight of the legumes.

16. The process according to claim 1 wherein the concentration of the flatulent-causing oligosaccharides in the legume is less than 0.5% by weight.

17. The process according to claim 16 wherein the concentration of the flatulent causing oligosaccharide is less than 0.05% by weight.

18. The process according to claim 1 which additionally undergoes preconditioning.

19. The process according to claim 1 which additionally comprises (d) soaking the legumes with a metal chelating agent in a concentration ranging from 0.1% to about 5% by weight.

20. The process according to claim 5 which additionally comprises (e) soaking the legume with a metal chelating agent in a concentration ranging from 0.1% to about 5% by weight.

21. The process according to claim 1 which additionally comprises adding a solution of a metal chelating agent in a concentration ranging from 0.1% to about 5% by weight to the soak water prior to or during step (a).

22. The process according to claim 21 wherein the chelating solution is added to the soak water prior to step (a).

23. The process according to claim 1 wherein step (c) further comprises changing the soak water.

24. The process according to claim 23 wherein changing the soak water comprises removing the old soak water and adding fresh water.

25. The process according to claim 23 wherein changing the soak water comprises adding fresh water and removing the old soak water at a rate sufficient to maintain a positive oligosaccharide-concentration difference driving force.

26. The process according to claim 1 wherein step (c) further comprises:
   (1) adding fresh water and removing old soak water at a rate sufficient to maintain a positive oligosaccharide concentration reduction driving force and minimize rupture or cracking of the legume skin;
   (2) continuing to soak the legume at said third temperature until all of the legumes are substantially removed or until there is no longer a positive oligosaccharide concentration reduction driving force, whichever comes first; and
   (3) repeating steps (1) and (2) until substantially all of the flatulence-causing oligosaccharides are removed from the legume.

27. The process according to claim 1 which produces a legume wherein substantially all of the gelatinizable starch is gelatinized.

28. A process for reducing flatulence caused by ingestion of a legume comprising:
   (a) placing legumes in a water bath having stagnant, sprayed or flowing water and monitoring the brix of the soak water;
   (b) soaking the legume in said water at a first temperature which is less than the critical rehydration temperature but greater than ambient temperature until an increase in the brix of the water bath is observed;
   (c) soaking the legume in a water bath at a transition temperature which is above the first temperature but less than the second temperature for at least until thermal equilibrium is attained;

(d) soaking the product of step (c) in a water bath at a second temperature which is greater than the temperature in step (c) but less than the inactivation temperature of a naturally occurring oligosaccharide reducing enzyme present in the legume and less than the maximum starch gelation temperature, said soaking at the second temperature being effected until the moisture content of the legume is greater than full hydration;

(e) soaking and heating the rehydrated legume of step (d) in a water bath at a third temperature at a pH ranging from about 5.5 to about 9.0 under conditions effective to substantially remove all of the flatulence-causing causing oligosaccharide from the legume, said third temperature being greater than the first critical rehydration temperature but less than the endogenous oligosaccharide reducing enzyme inactivation temperature and less than or equal to the second temperature.

29. The process according to claim 28 in which the third temperature of the soak water is at about the endogenous oligosaccharide reducing enzyme inactivation temperature and less than the second temperature.

30. The process according to claim 28 in which the third temperature of the soak water is within 5° F. of the endogenous oligosaccharide reducing enzyme inactivation temperature.

31. The process according to claim 28 in which the third temperature is greater than the endogenous oligosaccharide reducing enzyme inactivation temperature.

32. The process according to claim 28 which additionally comprises (f) blanching the legume product of step (e).

33. The process according to claim 28 wherein the legume is a navy bean, pinto bean, kidney bean, great northern bean, large or small white bean, pink bean, calico bean, cranberry bean, black bean, red bean, lentil, lima bean, purple hull bean, garbanzo bean, field pea, black-eye pea, chick pea, soybean or combination thereof.

34. The process according to claim 28 wherein the initial water source in step (a) has a calcium concentration ranging from about 0 ppm to about 120 ppm.

35. The process according to claim 28 wherein prior to the soaking step (a), the legumes are stored at a temperature of about 35° F. to about 50° F. until the legumes reach an equilibrium temperature.

36. The process according to claim 28 wherein step (a) is conducted at a temperature ranging from about 80° F. to about 130° F.

37. The process according to claim 36 wherein step (a) is conducted at a temperature ranging from about 90° F. to about 130° F.

38. The process according to claim 28 wherein the moisture content of the legume at the end of step (b) ranges from about 85% to about 97% of a fully hydrated legume.

39. The process according to claim 28 wherein in step (d), the temperature of the water bath ranges from about 141° F. to about 155° F.

40. The process according to claim 28 wherein the moisture content of the legume produced in step (d) ranges from about 54% to about 62% by weight of the legume.

41. The process according to claim 28 wherein the concentration of the flatulent-causing oligosaccharides in the legume produced is less than 0.5% by weight.

42. The process according to claim 28 wherein the concentration of the flatulent causing oligosaccharide in the legume produced is less than 0.05% by weight.

43. The process according to claim 28 which additionally undergoes preconditioning.

44. The process according to claim 28 wherein step (d) further comprises changing the soak water.

45. The process according to claim 44 wherein changing the soak water comprises adding fresh water and removing the old soak water at a rate sufficient to maintain a positive oligosaccharide-concentration difference driving force.

46. A process for preparing a legume product which comprises:

(a) soaking a legume in a water bath having stagnant, sprayed or flowing water at a first temperature which is above ambient temperatures but less than the critical rehydration temperature under conditions effective to rehydrate the legume to at least about 50% of that of a fully hydrated legume;

(b) heating the rehydrated legume (a) in a water bath at a second temperature under conditions effective to increase the moisture content thereof to an amount which is greater than that of full hydration, said second temperature being greater than the first temperature and the critical rehydration temperature, and less than blanching temperatures, and at about or above the endogenous oligosaccharide reducing enzyme inactivation temperature; and (c) soaking and heating the rehydrated legume of step (b) in a water bath at a third temperature at a pH ranging from about 5.5 to about 9.0 under conditions effective to substantially remove all of the flatulence-causing oligosaccharide from the legume, said third temperature being greater than the first critical rehydration and the first temperature but less than the second temperature and at about or above the endogenous oligosaccharide reducing enzyme inactivation temperature but less than the maximum starch gelation temperature;

(d) adding a food acceptable vehicle to the product of step (c) to form a legume containing mixture comprising from about 5% by weight to about 75% by weight of legume and the remainder being said vehicle; and (e) preserving the product of step (d).

47. A process for reducing flatulence caused by ingestion of a legume comprising:

(a) placing said legume in a water bath having stagnant, sprayed or flowing water and measuring the brix of the soak water;

(b) soaking the legume in said water at a first temperature which is less than the critical rehydration temperature but greater than ambient temperature until an increase in the brix of the water bath is observed;

(c) soaking the legume in a water bath at a transition temperature which is above the first temperature but less than the second temperature for at least until thermal equilibrium is obtained;

(d) soaking the legume in a water bath at a second temperature which is greater than the temperature in step (c), but at about or above the inactivation temperature of the naturally occurring oligosaccharide reducing enzyme present in the legume, but less than the maximum starch gelation temperature, said soaking at the second temperature being conducted until the moisture content of the legume is greater than full hydration;

(e) soaking and heating the rehydrated legume of step (d) at a third temperature at a pH ranging from about 5.5 to about 9.0 under conditions effective to substantially remove all of the flatulence-causing oligosaccharide from the legume, said third temperature being greater than the first critical rehydration temperature but less than the endogenous oligosaccharide reducing enzyme inactivation temperature and less than the second temperature;

(f) adding a food acceptable vehicle to the product of step (e) to form a legume containing mixture comprising from about 5% by weight to about 75% by weight of legume and the remainder being said vehicle; and (g) preserving the product of step (d).

48. The process according to claim 46 which additionally comprises blanching the product of step (d) prior to adding the food acceptable vehicle.

49. The process according to claim 47 which additionally comprises blanching the product of step (e).

50. The process according to claim 46 or 47 wherein the legume is a navy bean, pinto bean, kidney bean, great northern bean, large or small white bean, pink bean, calico bean, cranberry bean, black bean, red bean, lentil, soybean, lima bean, purple hull bean, black eye pea, field pea, chick pea, garbanzo bean or combination thereof.

51. The process according to claim 46 or 47 which produces a legume wherein substantially all of the starch is gelatinized.

52. The process according to claim 46 or 47 where the oligosaccharide concentration of the legume product is less than 0.05% by weight.

53. The process according to claim 46 or 47 which additionally produces a legume wherein substantially all of the gelatinizable starch is gelatinized.

54. The process according to claim 46 wherein the legume product of step (f) is preserved by retorting and wherein changing the soak water comprises adding fresh water and removing the old soak water at a rate sufficient to maintain a positive oligosaccharide-concentration difference driving force and minimize rupture or cracking of the skin of the legume when subjected to cooking.

55. The process according to claim 47 wherein the legume product of step (g) is preserved by retorting and wherein changing the soak water comprises adding fresh water and removing the old soak water at a rate sufficient to maintain a positive oligosaccharide-concentration difference driving force and minimize rupture or cracking of the skin of the legume when subjected to cooking.

* * * * *